(12) United States Patent
Colenbrander

(10) Patent No.: US 9,497,358 B2
(45) Date of Patent: Nov. 15, 2016

(54) VIDEO LATENCY REDUCTION

(71) Applicant: Sony Interactive Entertainment America LLC, San Mateo, CA (US)

(72) Inventor: Roelof Roderick Colenbrander, Costa Mesa, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 387 days.

(21) Appl. No.: 14/135,374

(22) Filed: Dec. 19, 2013

(65) Prior Publication Data

US 2015/0181084 A1    Jun. 25, 2015

(51) Int. Cl.

| H04N 5/05 | (2006.01) |
|---|---|
| H04N 5/04 | (2006.01) |
| H04N 5/232 | (2006.01) |
| H04N 5/06 | (2006.01) |
| H04N 1/327 | (2006.01) |
| H04N 13/00 | (2006.01) |
| G06F 3/14 | (2006.01) |

(52) U.S. Cl.
CPC ...... *H04N 5/04* (2013.01); *G06F 3/14* (2013.01); *H04N 1/32773* (2013.01); *H04N 5/05* (2013.01); *H04N 5/06* (2013.01); *H04N 5/232* (2013.01); *H04N 5/23222* (2013.01); *H04N 13/0029* (2013.01); *H04N 13/0059* (2013.01); *G09G 2340/02* (2013.01); *G09G 2370/022* (2013.01)

(58) Field of Classification Search
CPC .. H04N 1/00061; H04N 1/3273; H04N 5/04; H04N 5/05; H04N 5/06; H04N 5/23222; G06F 3/14
See application file for complete search history.

(56) References Cited

U.S. PATENT DOCUMENTS

| 5,034,817 A | 7/1991 | Everett |
| 5,502,462 A | 3/1996 | Mical et al. |
| 5,969,828 A * | 10/1999 | Kawasaki ............ H04N 1/0071 382/234 |
| 8,281,288 B1 | 10/2012 | Spencer |
| 2003/0110351 A1 | 6/2003 | Blood et al. |
| 2004/0174378 A1 * | 9/2004 | Deering ................ G06T 15/503 345/611 |

(Continued)

FOREIGN PATENT DOCUMENTS

| WO | 2009079560 A1 | 6/2009 |
| WO | 2011085024 A1 | 7/2011 |

OTHER PUBLICATIONS

International Search Report and Written Opinion for International Application No. PCT/US2014/061633, dated Mar. 26, 2015.

(Continued)

*Primary Examiner* — Robert Hance
(74) *Attorney, Agent, or Firm* — Joshua D. Isenberg; JDI Patent

(57) ABSTRACT

Aspects of the present disclosure relate to video capture. In particular, aspects of the present related to systems and methods for reducing latency in the capture of video frames. Various implementations of the present disclosure may add extra pixels to a video frame so that visible pixels within each frame may be transferred faster through a video interface. In particular, adding extra pixels to a frame may cause an increase in a pixel clock that is generated based on the total number of pixels within each frame. As a result of the corresponding decrease in the time needed to transfer visible pixels in each frame, latency due to delay in a video capture process may be reduced.

17 Claims, 10 Drawing Sheets

(56) References Cited

U.S. PATENT DOCUMENTS

| | | | |
|---|---|---|---|
| 2006/0061517 A1* | 3/2006 | Jolly | G09G 5/003 345/1.1 |
| 2008/0143729 A1 | 6/2008 | Wyatt et al. | |
| 2009/0135916 A1 | 5/2009 | Lee | |
| 2010/0149413 A1 | 6/2010 | Kumakawa | |
| 2010/0280817 A1 | 11/2010 | Unseld | |
| 2011/0263332 A1 | 10/2011 | Mizrachi | |
| 2011/0271067 A1 | 11/2011 | Chou et al. | |
| 2012/0184373 A1* | 7/2012 | Kim | H04L 65/4084 463/42 |
| 2012/0306326 A1 | 12/2012 | Schossmann et al. | |
| 2012/0306926 A1 | 12/2012 | Millet et al. | |
| 2013/0265389 A1 | 10/2013 | Hrebien | |
| 2014/0085275 A1* | 3/2014 | Tripathi | G09G 5/005 345/204 |
| 2014/0281023 A1* | 9/2014 | Apte | H04L 65/80 709/235 |
| 2015/0178018 A1 | 6/2015 | Colenbrander | |

OTHER PUBLICATIONS

International Search Report and Written Opinion for International Application No. PCT/US2014/061636, dated Mar. 5, 2015.
Final Office Action for U.S. Appl. No. 14/135,213, dated Feb. 25, 2016.
Taiwan IPO Search Report for TW Application No. 10313646, dated May 12, 2016.
International Preliminary Report on Patentability for International Application No. PCT/US2014/061633, dated Jun. 30, 2016.
Non-Final Office Action for U.S. Appl. No. 14/135,213, dated Jul. 28, 2016.

* cited by examiner

VIDEO LATENCY REDUCTION

CROSS REFERENCE TO RELATED APPLICATIONS

This application is related to commonly-assigned, co-pending U.S. application Ser. No. 14/135,213, to Roelof Roderick Colenbrander, entitled "MASS STORAGE VIRTUALIZATION FOR CLOUD COMPUTING", filed Dec. 19, 2013, the entire contents of which are herein incorporated by reference.

FIELD

Aspects of the present disclosure relate to video capture. In particular, aspects of the present related to systems and methods for reducing latency in the capture of video frames.

BACKGROUND

With bandwidths and data transfer rates of telecommunication systems continuing to advance, many of today's computing needs are shifting towards network-based distributed computing systems, commonly referred to as "cloud computing." Generally speaking, cloud computing involves offloading certain computing tasks to one or more remote computing resources and utilizing the remote computing resources to provide services to a local device. Cloud computing is often implemented as a client-server model, with the remote server providing desired computing capabilities to a local client device, avoiding the need for the local client device to perform certain computing tasks on its own. In many instances, the computing resources can be entirely or almost entirely offloaded to the server, with the client providing little or no more than a user interface for the cloud computing task, allowing potentially any internet connected device to serve as a client for a particular application.

Cloud computing has been adopted in a wide variety of computing services, including remote data storage solutions, music and video streaming services, and a wide variety of other consumer and business solutions. In general, cloud computing provides several well-known benefits, including increased efficiencies through the use of shared resources, increased flexibility in accessing content without restriction to a particular device, lower up-front costs when hardware upgrades become available, and other advantages.

One arena in which cloud computing has yet to achieve widespread adoption is in the ever popular field of video gaming. Video games, including personal computer (PC) games, home console games, handheld console games, and the like, remain a popular source of entertainment among consumers. With a large and ever growing collection of available video game titles, cloud gaming provides a particularly attractive solution to many video game demands. Ideally, within a cloud gaming framework a user would be able to instantly access any video game title from among a vast collection of remotely stored titles, without needing a physical copy of the game, without having to wait for the title to download, and without locally possessing the hardware system or resources needed to run the game. Rendering of graphics, changing game state in response to user inputs, and other gaming computations could then be performed remotely in the "cloud" and sent to the user's local device. Unfortunately, implementing this type of service within a traditional cloud computing server design presents several technical challenges that have thus far prevented widespread adoption of cloud gaming for many video game platforms.

One challenge is that many of today's video games are very fast paced and action packed, with advanced graphics that require a significant amount of computing resources to render. Particularly in a video streaming based server design, in which all of the game computations and graphics rendering computations are performed remotely, the game needs be able to perform all these tasks and deliver a compressed audio/video stream to the client device with minimal to no perceptible latency in response to control inputs. Otherwise, this may disrupt the timing for the player and fail to replicate the responsiveness of a traditional locally executed gaming session.

Another challenge stems from the fact that there has traditionally been a distinction between PC games on the one hand, which are designed to run on personal computers, laptops, and other computing systems of a general purpose nature, and console games on the other hand, which are designed to run on specialized systems known as video game consoles. Video game consoles are typically designed as embedded platforms having unique computing architectures specially adapted for the video gaming environment. Using dedicated console hardware as a video gaming platform provides several benefits, particularly in the form of optimizing the hardware for the high computing resource demands of graphics rendering and gaming computations required to produce many of today's video games. As a result, while PC games have achieved some popularity, console games have traditionally dominated the video game market and may continue to do so in the future.

However, adapting video game consoles and other embedded platforms to a cloud streaming service presents several challenges. Extensive modifications of the hardware or software architecture of the specialized platform may present compatibility issues with applications designed for the specialized platform. As a result, the desired application may need to be run on directly on the compatible architecture on a separate "terminal system" at the server side in order to execute the application for streaming over the network. The terminal system may be a game console architecture or other existing embedded platform designed to run the specialized application.

In order to stream the application over the network, techniques are needed to capture video frames from the application running on the terminal system in order to compress the output video signal before transmission. Conventional video capture cards are capable of capturing video frames transferred through a video interface link, such as HDMI, DVI, VGA, and the like, so that they may be compressed and sent to a remotely located display. However, delay in the time it takes to transfer each frame to the capture device contributes to latency between the time the frames are generated by application content and the time each frame is presented on a display at the client side. Perceptible latency may result from a combination of video capture delay, compression delay, network delay, and other sources. In cloud gaming and other cloud computing environments, minimizing latency is a critical task, and every millisecond counts in providing a responsive experience for the user at the client side.

It is within this context that the present disclosure arises.

SUMMARY

Implementations of the present disclosure may include a method for a first video frame image having a plurality of visible image pixels in a first display resolution. The method may include inserting the first video frame image into a source video frame having a second display resolution greater than the first display resolution. Inserting the first video frame image may include inserting the plurality of visible image pixels and a plurality of extra pixels into an active display region of the source video frame.

In some implementations, the method may further include forming an output video frame by adding a plurality of synchronization pixels to the source video frame; transferring the output video frame to a video capture device; capturing the visible image pixels in the output video frame with the video capture device, while omitting the extra pixels from said capturing; and compressing the first video frame image after the visible image pixels have been captured and before the entire active display region of the output video frame has been captured.

In some implementations, the source video frame may be in a stereo 3D format having two image regions in the active display region, with the two image regions corresponding to a left image region and a right image region. Inserting the first video frame image may include inserting the plurality of visible image pixels into one of the two image regions and filling the other of the two image regions with the extra pixels.

In some implementations, the first video frame image may have a plurality of visible image lines, with each said visible image line having a plurality of the visible image pixels. The source video frame may be in a mono format with the active display region defining a mono image region. The mono image region may have a plurality of active lines, each said active line having a plurality of active pixels. The number of active lines in the mono image region may be greater than the number of visible image lines in the first video frame image, and the number of active pixels in each said active line may be greater than the number of visible image pixels in each said visible image line. Inserting the first video frame may include inserting each said visible image line into a respective one of said active lines and filling the remainder of each active line with the extra pixels extra pixels. In other implementations, inserting the first video frame may include filling at least some of the active lines with the visible image pixels, such that at least some of the active lines each include the visible image pixels from more than one of the visible image lines Further implementations of the present disclosure may include a method for a first video frame image having a plurality of visible image lines, each said visible image line having a plurality of visible image pixels. The method may include forming an output video frame, the output video frame having the first video frame image and a synchronization region, with the synchronization region having a plurality of synchronization pixels between each said visible image line which indicate a transition between each said visible image line, and the synchronization region having a plurality of synchronization lines after the last of the plurality of visible image lines which indicate the end of the frame. Forming the output video frame include adding a plurality of dummy lines of extra pixels to the synchronization region after the synchronization lines.

Further implementations of the present disclosure may include a system having a first processing unit and a first memory unit operatively coupled to the first processing unit. The system may be configured to perform a method for a first video frame image having a plurality of visible image pixels in a first display resolution. The method may include inserting the first video frame image into a source video frame having a second display resolution greater than the first display resolution. Inserting the first video frame image may include inserting the plurality of visible image pixels and a plurality of extra pixels into an active display region of the source video frame.

Further implementations of the present disclosure may include a system having a first processing unit and first memory unit operatively coupled to the first processing unit. The system may be configured to perform a method for a first video frame image having a plurality of visible image lines, each said visible image line having a plurality of visible image pixels. The method may include forming an output video frame, the output video frame having the first video frame image and a synchronization region. The synchronization region may have a plurality of synchronization pixels between each said visible image line which indicate a transition between each said visible image line, and the synchronization region may a plurality of synchronization lines after the last of the plurality of visible image lines which indicate the end of the frame.

Forming the output video frame include adding a plurality of dummy lines of extra pixels to the synchronization region after the synchronization lines.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Aspects of the present disclosure relate to techniques for reducing video transfer delay by adding extra pixels to each video frame in a stream. Generally speaking, a video frame will consist of both visible pixels and invisible pixels, wherein the visible pixels define the image of the frame for display, while the invisible pixels may be used, e.g., for synchronization. Implementations of the present disclosure may add extra pixels to a video frame so that visible pixels within each frame may be transferred faster through a video interface. In particular, adding extra pixels to a frame may cause video transfer hardware to increase a pixel clock rate based on the total number of pixels within each frame. As a result of the corresponding decrease in the time needed to transfer visible pixels in each frame, latency due to delay in a video capture process may be reduced.

Implementation Details

Figure 1:
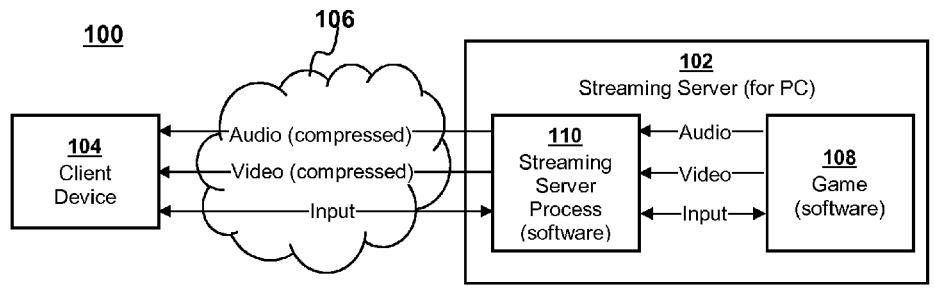
FIG. 1 is a schematic diagram of an example streaming technique over a network.

To better illustrate various aspects of the present disclosure, a first illustrative example of a distributed computing system 100 is depicted in FIG. 1. The distributed system 100 depicted in FIG. 1 involves a plurality of computing devices 102,104 connected over a network 106, such as the internet.

In the example distributed system, a streaming server 102 executes a program 108 in order to provide a real-time stream of the program output to the remotely connected client device 104 through the network 106. In the illustrated schematic diagram of FIG. 1, the program 104 may be a video game program which processes control inputs received from the client device 104 and sends a compressed audio and video stream to the client device 104 in accordance with the execution of the program 108. A user located at the client side may interact with the program through a user interface of the client device 104, e.g., by providing control inputs and receiving the audio and video game output at a display and/or speakers connected to the client device 104. In the example of FIG. 1, the computational load for processing the inputs, rendering the video game graphics, and the like, may be entirely offloaded to the streaming server 102 for remote execution.

In order to implement the cloud gaming using the system 100 depicted in FIG. 1, the streaming server 102 may be configured to not only execute the game program 108, but the streaming server 102 may also implement a "streaming server process" 110 embodied in the server 102, which may perform various functions to coordinate the program inputs/outputs for communication between the client device 104 and the streaming server 102 over the network 106. By way of example, the streaming server process 110 may be embodied in one or more applications which are run on the streaming server 102 in coordination with the game software 108. Remote execution of the game 108 together with the streaming server process 110 may be performed with minimal or no latency between the inputs and outputs at the client device 104 so that the user at the client side perceives that the program 108 is being executed locally. Moreover, a wide collection of remotely stored programs may be accessible for execution. For example, in a cloud gaming application, the user would like to be able to select any game designed for the relevant video game platform, and the remote server would be able to load the game, execute it, and streams its output to the client device in accordance with inputs received from the user and with no perceptible latency between the received inputs and audio/video outputs.

In the example depicted in FIG. 1, this may be accomplished by executing both the streaming server process 110 and the game code 108 at the same computing device, e.g., the streaming server 102. The streaming server may process the video content of the application for capture, compression, and transmission over the network using various components implemented within the streaming server architecture. For cloud gaming, and other cloud computing implementations, this may be readily implemented if the software application 108 that is executed at the server 102 for the client 104 is designed to run personal computer (PC) architecture or other computer architecture that is similar to the streamliner server 102. By way of example, and not by way of limitation, for a PC cloud gaming implementation, a readily available x86 based server may be used to not only implement the streaming server process 110, but also execute the PC game program 108 once it is accessed by the server 102.

However, the example technique 100 depicted in FIG. 1 may not be suitable for certain applications in which the program 108 is designed to be executed on embedded platforms and other specialized architectures. For example, if the desired program is a video game designed for a dedicated console platform, the game software may not be able to run on the server architecture without some type of emulator. Unfortunately, emulators are typically difficult and costly to develop, and a suitable emulator might not be available. Moreover, in many cases it would be impractical to build a dedicated server for each unique architecture for which a cloud service is desired, and the embedded platform may not have enough free computing resources (e.g., CPU, memory) to support video compression and other server processes. Likewise, there may be compatibility issues with using extra resources that have different performance characteristics from the existing platform.

Figure 2:
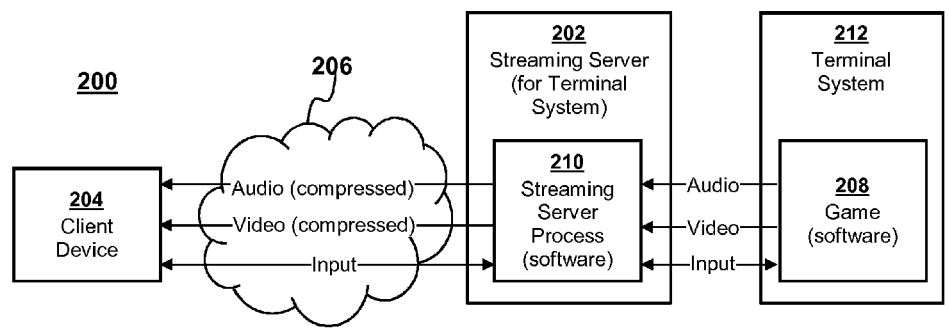
FIG. 2 is a schematic diagram of another example streaming technique over a network.

In order to address these challenges, it may be desirable to utilize an additional computing device at the server side for execution of the program, whereby the additional computing device executes the desired program while the streaming server coupled to this additional computing device performs its usual functions for interfacing with a client device. An illustrative example of a distributed system 200 which utilizes such a technique is depicted in FIG. 2, in which a "terminal system" 212 is connected to a streaming server 202, and the terminal system executes a desired application 208. The streaming server can provide resources for network storage and video compression if the terminal system does not otherwise have sufficient free resources for these functions.

In certain implementations, the terminal system 212 may be an embedded system or other computing system having a specialized architecture, such as a video game console, while the streaming server 202 may be based on any computing architecture, such as an x86 instruction set architecture, which is adapted to provide streaming services and does not necessarily have to have a similar architecture as the terminal system 212. The streaming server 202 may be configured to execute a streaming server process 202 and provide the usual cloud services for the terminal system program 208, and the computing devices at the server side, e.g., the streaming server 202 and the terminal system 212, may collectively operate to provide video game streaming services for a client device 204.

The configuration in the simplified schematic depicted in FIG. 2 may provide a practical and flexible server solution that can be readily adapted to a variety of different software platforms designed for a variety of different computing architectures. For example, potentially any streaming server 202 could be adapted to stream software applications designed for a variety of different computing architectures by locally connecting a terminal system which runs the software.

However, executing the desired software on a terminal system 212 at the server side may present certain challenges within a cloud computing framework and new techniques may be useful to capture and compress video output from the terminal system 212. A conventional video capture card could be used to capture the video content of the application through a video I/O interface of the terminal system, such an HDMI link, but the process of capturing video data sent through the interface may add significant latency when using conventional techniques.

Figure 3A:
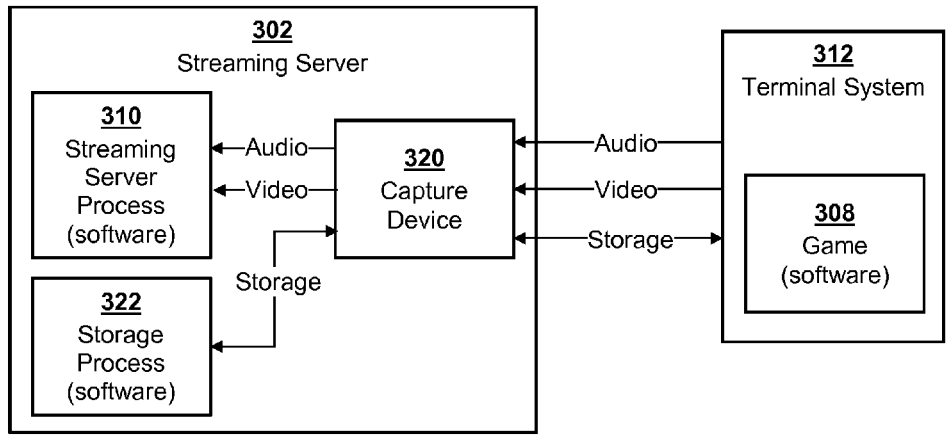
FIG. 3A is a schematic diagram of an example streaming system having a video capture card for capturing and compressing video data from a video source.

An illustrative example of a video capture technique using a video capture device 320 is depicted in FIG. 3A. In the example capture technique of FIG. 3A, video data, and optionally audio data, that is output from the application 308 running on the terminal system 312 may be captured using a capture device 320 coupled to the streaming server 302. The capture card 320 may receive a video stream through a video interface with the terminal system 312, and, together with a streaming server process 310 implemented by the streaming server 310, may compress the video data and for streaming over a network, e.g., as shown in FIG. 2. By way of example, and not by way of limitation, the capture device 320 may be implemented as an expansion card, such as a PCI-Express add-on card, which may be connected to the streaming server 302 through an expansion interface.

In accordance with various aspects of the present disclosure, the example video capture system depicted in FIG. 3A could be optimized to reduce latency in the capture process by adding extra pixels to each video frame, such that the visible image within each frame reaches the video capture device 320 with less delay.

In some implementations, the capture card 320 may also provide storage virtualization functionality for the terminal system 312 in order to provide an integrated approach to cloud computing applications involving the terminal system 312. Further details of a storage virtualization technique that may be implemented by the capture card 320 and streaming server 302 are described in commonly-assigned, co-pending U.S. application Ser. No. 14/135,213, to Roelof Roderick Colenbrander, entitled "MASS STORAGE VIRTUALIZATION FOR CLOUD COMPUTING", filed the same day as the present application, the entire contents of which are herein incorporated by reference.

Figure 3B:
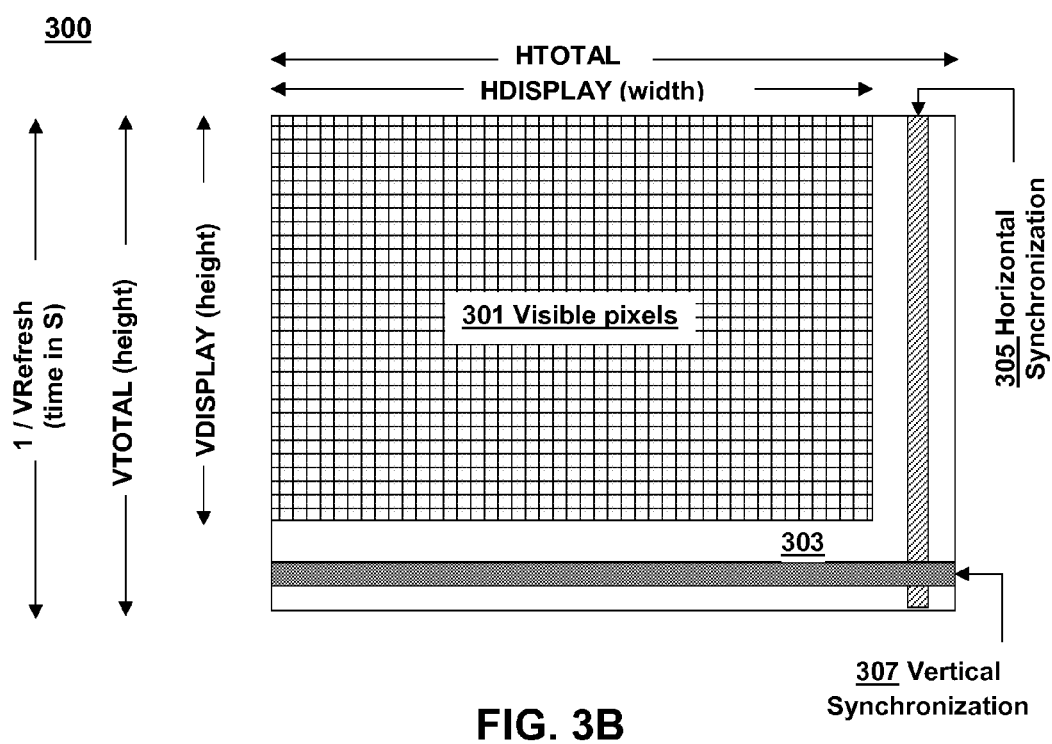
FIG. 3B is a schematic illustration of an example video output frame.

To better appreciate various aspects of the present disclosure, it is first beneficial to discuss how video frames are transferred from a video source through a video interface, such as HDMI, DVI, VGA, DisplayPort, and the like. Turning to FIG. 3B, an illustrative example of a video output frame 300 is depicted. The example output frame 300 may be one frame in a sequence of similarly formatted frames which collectively make up a video stream. The video frame sequence may be output from some video content source, such as a video game application, video file, live stream, and the like.

As shown in FIG. 3B, the output frame 300 may be made up of an array of pixels, which can be represented by a corresponding array of pixel data values. The output frame 300 may also be transmitted with additional signals external to the pixel data values, as described below.

Each pixel data value in the array may include a plurality of color space components depending on the particular color model used. For example, each pixel data value in the array may include two chroma (color) values and luma (intensity) value for the corresponding pixel, if a YCrCb (digital video) or YPbPr (analog video) is used. Alternatively, RGB color space, or some other set of color space components may be used for the pixel data of each pixel. Moreover, the pixel data values for each color space component of each pixel may be digitally represented by a plurality of bits. For example, a 24-bit color depth may utilize 8-bits per color space component per pixel. The term "pixel" is sometimes used herein as a shorthand when referring to that portion of an output frame that corresponds to a single tick of a pixel clock.

In addition to pixel data values, an output frame may also include external signals in addition to the pixel data values. The external signals may include a signal having information indicating whether the pixel is visible, e.g., a data enable signal indicating whether the pixel is meant to be displayed and therefore has a visible pixel contained in the pixel data values for that pixel. As can be seen in the example output frame 300 of FIG. 3, the total number of pixels in the array includes both visible pixels 301 (illustrated in the figure as a grid), and invisible pixels 303 (illustrated in the figure as the blank and lined regions). In the example frame of FIG. 3B, the visible pixels 301 make up the active image region of the output frame, which may be indicated by a high data enable value, and the invisible pixels 303 make up the synchronization region of the output frame, which may be indicated by low data values. The visible pixels 301 in the active image region may collectively make up the visible image of the frame that is meant to be displayed. It is noted that in the example output frame 300 of FIG. 3B, the visible pixels of the video frame image coincide with the active region of the frame's format.

Most devices, e.g., consoles, PCs, phones, and other video sources, render video frames to a 'frame buffer' organized in RGB pixels with typically at least 8-bit/1-byte per color component. The video signal generated by a video transmitter, which may be part of the GPU that renders the video frames or which may be external to the GPU, may transport pixels in RGB, but it can do so in other color space models, such as YCrCb (digital video) or YPbPr (analog video), in case something (e.g., the transmitter) has to convert from RGB to the other format.

Once a GPU has completed rendering it may 'scan the frame out', which is the process of sending the frame pixel by pixel over some serial connection (e.g. HDMI, DVI, etc.). The scanout process may involve the generation of the external signals of the output frame, e.g., output frame 300, and the scanout process may partly depend on the type of video connection, as well as whether the 'video transmitter' is inside the GPU or outside it. In general the GPU may generate a plurality of signals when scanning the frame out, including signals external to the pixel data values. The signals when scanning the frame out may include:
- pixel clock signal
- data enable signal
- horizontal synchronization (hsync) signal
- vertical synchronization (vsync) signal
- data bus signals that carry color space components for active pixels (e.g., RGB, 24-bit wide, with 8-bits per color space component)

During scanout of the rendered frame, the GPU may retrieve the pixels from the buffer that holds the completed frame image (e.g., the frame buffer). As an example, say the GPU is currently at the first pixel of a line. For the given line, it will place a new pixel on the data bus signals at each 'tick' of the pixel clock signal. Also it will output a 'high level' on the data enable signal corresponding to that pixel.

At the end of the line there is a horizontal blanking period (of duration HTOTAL−HDISPLAY pixels, or pixel clock pulses). During the blanking period several signals change. First of all, a pulse may be generated on the hsync line to notify a transition to the next line. The 'data enable' signal is made low, which means that any data currently on the data bus signals should not be interpreted as pixels ('these are the invisible pixels at the end of the line').

This process may continue line by line until the end of the frame image. At the end of the frame, a pulse is generated on the vsync line. For any of the 'invisible lines' at the end of the frame, the data enable line is also low.

Generally, whenever the data enable signal is low, the pixel is 'invisible', and the pixel data values do not contain the desired color space values which correspond to the display region of the image. Since there is always an active pixel clock, 'invisible pixels' are essentially generated on the data bus. It is noted that horizontal and vertical synchronization signals are stored outside of the pixel data.

The process of transmitting video signals, e.g., made up of output frames 300, over a serial interface may depend on the video technology. For classic VGA, the described signals are actually directly consumed by the monitor, including the pixel data signal and the external signals associated with the frame. The external signals may include timing signals directly used for VGA. The pixel data signals may be analog signals in which each color component has its own channel, e.g., a red signal channel, a green signal channel and a blue signal channel. A Digital to Analog Converter (DAC) may generate the analog pixel signal from the digital data bus signals (from the described 24-bit with 8-bit per channel). For other technologies like DVI, HDMI, or DisplayPort, a transmitter may accept the above described signals and convert them to a signal appropriate for that technology. In case of HDMI, the HDMI transmitter has 3 TMDS data channels (TX0 to TX2) and a TMDS clock, in which the HDMI transmitter embeds all the signals (hsync signal, vsync signal, pixel data signal) and TMDS clock contains the pixel clock signal in some way. The HDMI receiver on the other end of the cable inside the 'sink', has these signals as inputs, but recovers hsync, vsync, data and the other signals. This is the same way for other video standards like DVI or DisplayPort.

If the video transmitter is internal to the GPU, the scanout logic may operate on the described signals, but the scanout logic may also directly output, e.g., HDMI, bypassing the intermediate step for these other signals.

The pixel data values and other signals associated with each pixel for the output frame are typically output line by line, with each line containing a plurality of pixels and each frame containing a plurality of lines. Normally, these lines are horizontally oriented, and the pixels in a horizontal line may be transferred in sequence, e.g., serial transfer, from left to right through a video communication interface from the video source to the display device or other video sink device. Similarly, the horizontal lines may be output in sequence from top to bottom until the end of the frame is reached. Accordingly, all the pixels in the frame 300, including both visible 301 and invisible pixels 303, may have a defined sequence for transfer.

In the example output frame 300 of FIG. 3B, each line of the frame is a horizontal line having a total number of pixels HTOTAL, which may define the total horizontal resolution of the output frame. Similarly, the example output frame 300 has a total number of lines VTOTAL, which may define the total vertical resolution of the frame. Thus, the total horizontal and vertical resolution includes both visible and invisible pixels.

The active display region 301 of the frame may include a plurality of active lines VDISPLAY defining the vertical display resolution of the frame, and each active line may include a plurality of active pixels HDISPLAY, which defines the horizontal display resolution of the frame. The active display regions 301 may correspond to that image of a frame that is rendered by a GPU and output to the frame buffer as described above.

The total resolution (e.g., HTOTAL×VTOTAL) of the output frame 300 may be greater than the display resolution (e.g., HDISPLAY×VDISPLAY) of the output frame, due to the presence of the synchronization region 303 in the frame, which may be generated during the scan out of the frame, e.g., after the active display region of the frame is rendered to a frame buffer, as described above. Specifically, the active display region corresponds to those pixels retrieved from the frame buffer, while the synchronization region refers to those pixels generated due to the addition of external signals, e.g., for scan out of the frame of the frame as described above. The synchronization region 303 may include a plurality of invisible pixels at the end of each line corresponding to the horizontal blanking region and a plurality of invisible lines at the end of each frame corresponding to the vertical blanking region. Generally speaking, the synchronization signals of the blanking regions may be provided to synchronize the video stream transfer between the video source and a display, with the HSYNC signals generally indicating the transitions between each line in the frame, and the VSYNC signals generally indicating the transitions between each frame in the sequence of frames that makes up the video stream. While the hsync and vsync signals are external signals that are not part of the 'pixel data', since the GPU always outputs the pixel data and synchronization signals on the pixel clock, there happen to be 'invisible pixels' in the pixel data during the period when pulses on hsync or vsync lines are active. In the case of HDMI, hsync and vsync are actual transported in the pixel data. Then, after transport over an HDMI cable, the HDMI receiver would separate the signals again.

As can be seen in the example of FIG. 3B, transferring the pixels of the frame 300 in sequence, e.g., pixel by pixel, will result in the pixels 305 corresponding to the HSYNC region being transferred at the end of each line, and the pixels 307 corresponding to the VSYNC region being transferred at the end of the frame 300. The horizontal synchronization signals may include an HSYNC pulse 305, with a corresponding horizontal front porch and horizontal back porch (illustrated in the diagram as blank regions before and after the HSYNC pulse 305, respectively), and the vertical synchronization signals may include a VSYNC pulse 307 with a corresponding vertical front porch and vertical back porch (illustrated in the diagram as blank regions before and after the HSYNC pulse 307, respectively), and these pixels may collectively make up the synchronization region 303 of the output frame 300.

With reference to the example of FIG. 3B, a video signal may be made up of a plurality of video frames similar to the output frame 300, and output frames may be transferred from a video source to a display device, video capture device, or other video sink device through a video interface, such as HDMI, DVI, VGA, and the like. Generally speaking, a refresh rate (e.g., VRrefresh) of display hardware should correspond to the frame rate (e.g., number of frames per second) of an output a video stream. As a consequence, the timing of the transfer of pixels through an interface between a video source and a display device should be synchronized in order to ensure that the rate of transfer of the pixels in the video stream is synchronized with the display and keeps up with the display refresh rate.

Typically, a pixel clock, which may be an external signal generated by electronics or other components embodied in the video transfer hardware, and which may be an external signal generated in association with the scan out of the frame as described above, governs the timing for the transfer of each pixel between video source and video sink. Generally speaking, the pixel clock will control the timing of the transfer of pixels so that the total number of pixels within each frame is transferred from the video source at a rate that is in sync with the refresh rate of the display device. For a serial interface in which pixels are transferred sequentially one after another, the pixel clock may be mathematically expressed as a product of the total number of pixels within each line, the total number of lines within each frame, and the vertical refresh rate as follows:

Pixel Clock=$HTOTAL*VTOTAL*VRefresh$

Standard video interfaces typically support different display resolutions (e.g., HDISPLAY×VDISPLAY), such as 720p (1280×720), 1080p (1920×1080), and the like, which each have a different total number of pixels for each frame. A pixel clock generator embodied in the video transfer hardware may be configured to generate a pixel clock for a given video resolution and/or frame rate based on a formula similar to the mathematical expression shown above, e.g., based on the refresh rate and the resolution of each frame.

It is important to note that the upper bounds of the pixel clock may be limited due to practical considerations and technical requirements of the electronics and components involved, as well as a practical limit to the frequency at which the pixel clock may be accurately maintained. For example, display manufacturers typically want to keep the pixel clock as low as possible because the higher it is, the more it complicates the design of the electronics and the component costs. As a result, with reference to FIG. 3B, the number of active lines (VDISPLAY) and total number of lines (VTOTAL) in a frame are typically close in value because only a small number of lines are required for the vertical synchronization signal, and conventional wisdom generally dictates that utilizing more lines than necessary is undesirable.

Various implementations of the present disclosure may incorporate techniques for decreasing the time to transfer an output video frame by artificially increasing the total number of pixels, i.e., ticks of a pixel clock, in a frame beyond what is needed to encompass the visible pixel data and/or synchronization signals within each output frame. As a result, a pixel clock rate may be increased to output the greater number of total pixels, causing the desired visible pixels embodying the visible video frame image within the active region of the output frame to be transferred in less time. In some implementations, this may be accomplished by increasing the number of lines at the end of each frame's sequence or otherwise putting the output frames in some frame format that has a greater number of total pixels than the source frame image.

By way of example, and not by way of limitation, for the example output video frame 300 depicted in FIG. 3B, assuming a 60 Hz refresh rate (VRefresh), all the visible image lines of an output frame will have been output every VDISPLAY/VTOTAL*$\frac{1}{60}$ Hz, e.g., based on the ratio of the active display lines to the total number of lines in the frame.

Where VDISPLAY and VTOTAL are close in value, the time to output the image 301 within the frame would be roughly ~$\frac{1}{60}$ Hz, which corresponds to 16.7 ms. In accordance with various aspects of the present disclosure, this time to output the visible image lines of a frame may be reduced by making VTOTAL significantly larger than VDISPLAY. Thus, for the same 60 Hz vertical refresh rate mentioned above, if VTOTAL is twice the size of VDISPLAY, that is the total number of lines within a frame is double the number of visible/active lines within the frame, the transfer time reduces to 8.3 ms, since after VDISPLAY/VTOTAL=0.5*16.7, the desired image within the frame would be transferred. VDISPLAY/VTOTAL may be made smaller, for example, by adding lines to the frame in some fashion.

Figure 4A:
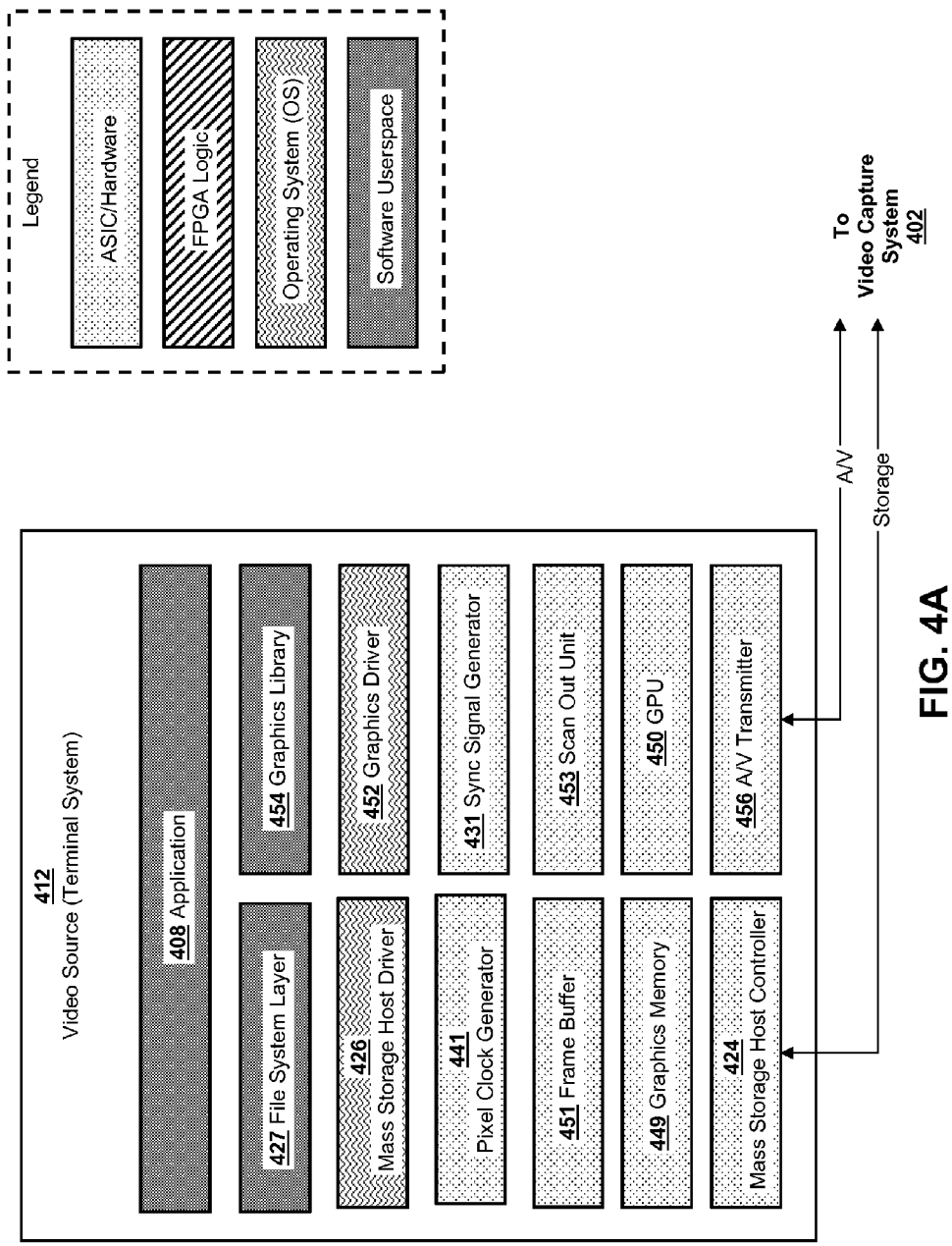
FIG. 4A is a schematic diagram of an example terminal system architecture functioning as a video source.
Figure 4B:
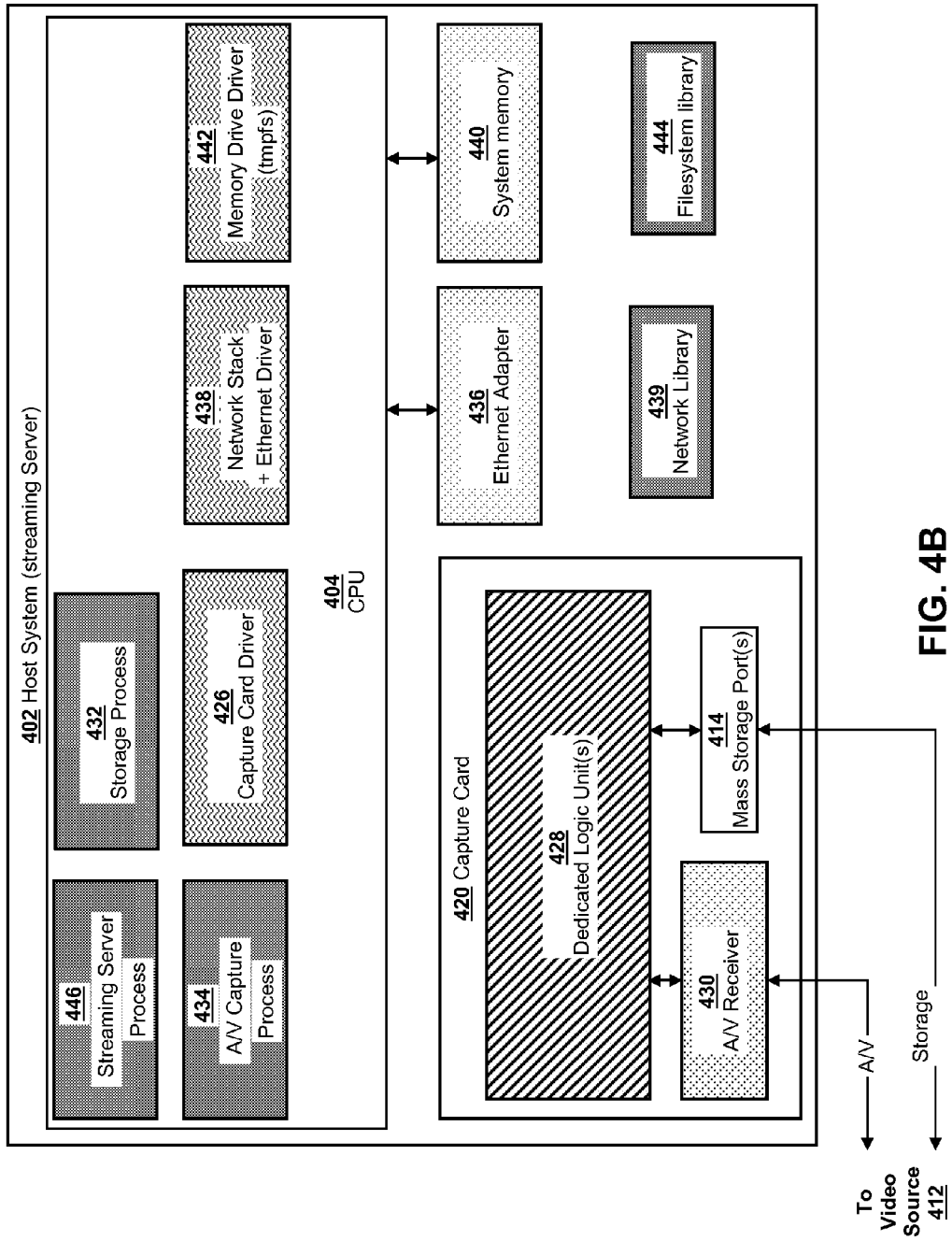
FIG. 4B is an example host system and capture card architecture which may capture and compress video frames from the video source.

FIGS. 4A and 4B provide an overview of an example hardware/software architecture for generating and capturing video frames according to various implementations of the present disclosure. In particular, the example system of FIGS. 4A and 4B may be a system for streaming video games and other applications using a streaming server and a terminal system setup similar to that depicted in FIG. 3A. FIG. 4A illustrates an architecture for an example video source according to various aspects of the present disclosure, and FIG. 4B illustrates an architecture for an example video capture system for capturing video from the video source according to various implementations of the present disclosure. In some implementations, the video source 412 may be a terminal system similar to FIG. 3A which is configured to run an application for cloud streaming, and may be an existing embedded system, video game console, or other computing device having a specialized architecture. In some implementations, the video capture system 402 (video sink) may be a streaming server configured to capture and stream the video output from the terminal system to a client device, e.g., as depicted in FIG. 2. However, it is emphasized that the illustrated architecture of FIGS. 4A and 4B is provided by way of example only, and that various implementations of the present disclosure may involve reducing video transfer time using other architectures and in other contexts beyond cloud gaming and cloud computing applications.

Turning to FIG. 4A, the example video source may be a terminal system 412 that is configured to run an application 408, which may involve a video output to be captured by the video capture system 402. By way of example, and not by way of limitation, the application may be a video game having rendered graphics as a video output, which may be transferred to the streaming server 402 for sending over the network. In particular, the terminal system may include graphics processing unit (GPU) 450, which together with the graphics memory 449 may be configured to render the application output 408 as a sequence of images for video frames. The images may be output as a sequence of video frames that have visible pixels which contain the pixel data for the image of each frame for display on a display device, and the video frame images may be sent to the video capture system 402 through a video interface, such as HDMI, as output frames having both visible and invisible pixels. However, in order to reduce delay stemming from the video capture process, the video source may be configured to add extra pixels so that enlarged output frames are sent through the video interface. Further examples of how extra pixels may be added to the output frames are described below.

In order to support the output of the video signal, the video source 412 may include a graphics driver 452 configured to interface with the GPU 450 for rendering the application video signal as a sequence of video frame images. In particular, the GPU 450 may generate video frame images for video signal output in accordance with the application 408, and the graphics driver 452 may coordinate with the GPU 450 to render the video frame images into source video frame format having a supported a particular display image resolution, e.g., 720p. The GPU 450 together with the graphics driver 452 may render video frame images in a format having a plurality of visible image lines, with each visible image line having a plurality of visible image pixels. In certain implementations, the graphics driver 452 may be configured to add extra pixels in addition to the frame image pixels rendered by the GPU, e.g., by rendering the frame in an enlarged frame having a greater resolution than the number of pixels in the video frame image. Further examples of enlarging a frame by rendering it in an enlarged frame format are described below.

More specifically, the video source 412 may include a frame buffer 451 and a scan out unit 453, which may be operatively coupled to the GPU 450, and, in certain implementations, may be embodied in the GPU 450. The GPU 450 may be configured to render video images to the frame buffer 451, e.g., based on the output of the application 408, and the scan out unit 453 may be configured to retrieve the frame images from the frame buffer 451 and generate additional external signals for sending the image as an output frame over the interface, e.g., as described above.

In particular, the scan out unit 453 may include a pixel clock generator 441 for generating a pixel clock signal the scan out of the frame and/or a sync signal generator 431 for generating the synchronization signals, e.g., hsync and vsync signals, with each output frame. For example, the sync signal generator 431 may add an hsync signal that has a horizontal blanking region at the end of each line of the frame, and corresponds to a plurality of invisible pixels at the end of each line of the frame. The signal generator 431 may also add a vsync signal that has a vertical blanking region at the end of each frame and corresponds to a plurality of invisible lines at the end of the frame. The pixel clock generator 441 may generate a clock signal having a pulse associated with each pixel in the output frame generated for transfer over the video interface, including the total number of active pixels retrieved from the frame buffer 451 and the total number of pixels corresponding to the synchronization regions inserted between the active pixels. It is noted that the pixel clock generator 441 and/or the sync signal generator 431 may be contained as part of the scan out unit 453, and the scan out unit 453 may be contained as part of the GPU 450. However, it is emphasized that this is just an illustrative example, and that one or more over the components may be implemented as separate components.

The video source may include a video transmitter 456 coupled to a video communication interface, and the transmitter may transfer the video signal to the video capture system 402 through a serial communication interface, e.g., pixel by pixel in sequence, with the sync signals indicating transitions between lines and frames in the sequence accordingly. The a pixel clock generator 441 which may generate a clock signal to synchronize the timing of each pixel, e.g., based on the total number of pixels and frame rate of the video content, as discussed above. In certain implementations, the pixel clock generator 441 may generate a pixel clock with increase transfer frequency in each pixel, based on extra pixels contained within the active display region within each image, extra pixels contained within the synchronization region, or both. Optionally, the video interface may also support audio transfer, such as with an HDMI interface, and an audio signal output from the application may also be submitted through the video interface. In alternative implementations, a separate audio interface may be used.

The video source may be configured to send the output video signal to a video capture device 420 coupled to a computing system 402. The capture device may receive the video pixel data contained in the transferred video signal so that it may be captured in digital form and compressed by the streaming server 402. The streaming server 402 may include a video capture process 434 and/or an encoder which may be configured to compress each video frame received from the video capture device. A streaming server process 446 may be configured to transmit the compressed video stream to a remotely located device so that the compressed video stream may be decompressed and displayed on a remote display device.

In certain implementations, the video capture device may contain video capture logic 428 which is specially configured to capture only the visible pixels of a video frame image contained within an enlarged frame in accordance with various aspects of the present disclosure. For example, in certain implementations, the graphics rendering components of the video source may be configured to insert the visible image pixels of a video frame image in only a portion of the active display region of a particular format, and the video capture device 420 may be configured to count lines and/or pixels within each frame that is received in order to know when capture of the display image is complete. This may be based on a predetermined configuration of how frames are rendered by the video source. Alternatively, the video capture device 420 may determine that capture is complete based on the presence of a synchronization signal, e.g., a VSYNC signal in implementations where frames are enlarged by adding synchronization lines. The streaming server 402 or other computing device may be configured to begin compression the video frames as soon as capture of the visible display image within each frame is complete.

The capture device may receive the video signal through communication interface that is compatible with the video signal output from the video source 412, and the video interface may be coupled to a video receiver 430. By way of example, and not by way of limitation, the video capture device may include one or more ports as part of an audio and/or video communication interface, e.g., HDMI ports or other ports as described below with reference to FIG. 5.

The interface device 402 may include a specialized processing unit containing the logic 428 that is operatively coupled to the video signal interface, with the specialized processing unit having logic 428 that is dedicated to performing functions associated with A/V capture, and optionally other functions associated with cloud streaming, for signals received through a connector from the terminal system 402. The logic 428 may also support communication with the host system 402 through an additional communication interface, which may communicate with a peripheral bus of the host system 402 in order to interface with an A/V process embodied in the host system. By way of example, and not by way of limitation, the interface device 420 may be an add-on card which communicates with the host system 402 memory/CPU through an expansion interface, such as peripheral component interconnect (PCI), PCI-eXtended (PCI-X), PCI-Express (PCIe), or another interface which facilitates communication with the host system 402 e.g., via a peripheral bus. The host system may include an capture device driver 426 to support the exchange of signals via the interface device 420.

In certain implementations, the specialized processing unit may be a field programmable gate array (FPGA), an application specific integrated circuit (ASIC), or another specialized processing unit having dedicated units of logic configured in accordance with principles described herein. The logic units 428 of the specialized processing unit may also include dedicated logic to support various functions for cloud streaming in addition to audio/video capture of the output from an application 408 running on the terminal system 402, such as storage virtualization in coordination with a storage process 432.

In the example depicted in FIGS. 4A-4B, an A/V capture unit embodied in the logic 428 of the specialized processing unit may communicate with the capture device driver 426 in the host system 402, and a A/V process 432 embodied in the host system 402, e.g., a software application running on a central processing unit 404. For example if the terminal system 412 sends video pixels to the video capture device, this video data may make it through the graphics driver 452, the video capture unit contained in the logic 428, the capture device driver 426, to the A/V process 432 embodied in the host system. The A/V process 432 may then compress the captured video frames, and the compression may begin sooner in accordance with an increase in the pixel clock caused by extra pixels. In certain implementations, the video sink 402 may optionally be a streaming server adapted to transmit over a network a stream of video output from the application 408 running on the terminal system 412. For example, the streaming server 402 may include an Ethernet adapter or other network adapter 436, and a corresponding Ethernet driver or other network driver 438 for the operating system of the host 402, with a compatible network library 439 providing protocol support for the network communication. The host system may also include system memory 440, controlled by a corresponding memory driver 442 (e.g., tmpfs) and supported by a file system library 444. A streaming server process 446 may be run on the host system 402 to perform functions associated with provide a real time stream to a client device connected over a network (not pictured in FIGS. 4A-4B).

The terminal system 412 may include various other components to support the application 408, which may be, e.g., video game software designed for an existing embedded platform. The terminal system 412 may include a file system layer 427 to access storage, as well various components to support graphics storage access. In some implementations, systems and the capture device 420 may be configured to implement a storage virtualization technique, further details of which are described in commonly-assigned, co-pending U.S. application Ser. No. 14/132,213, to Roelof Roderick Colenbrander, entitled "MASS STORAGE VIRTUALIZATION FOR CLOUD COMPUTING", filed the same day as the present application, the entire contents of which are herein incorporated by reference.

Figure 5:
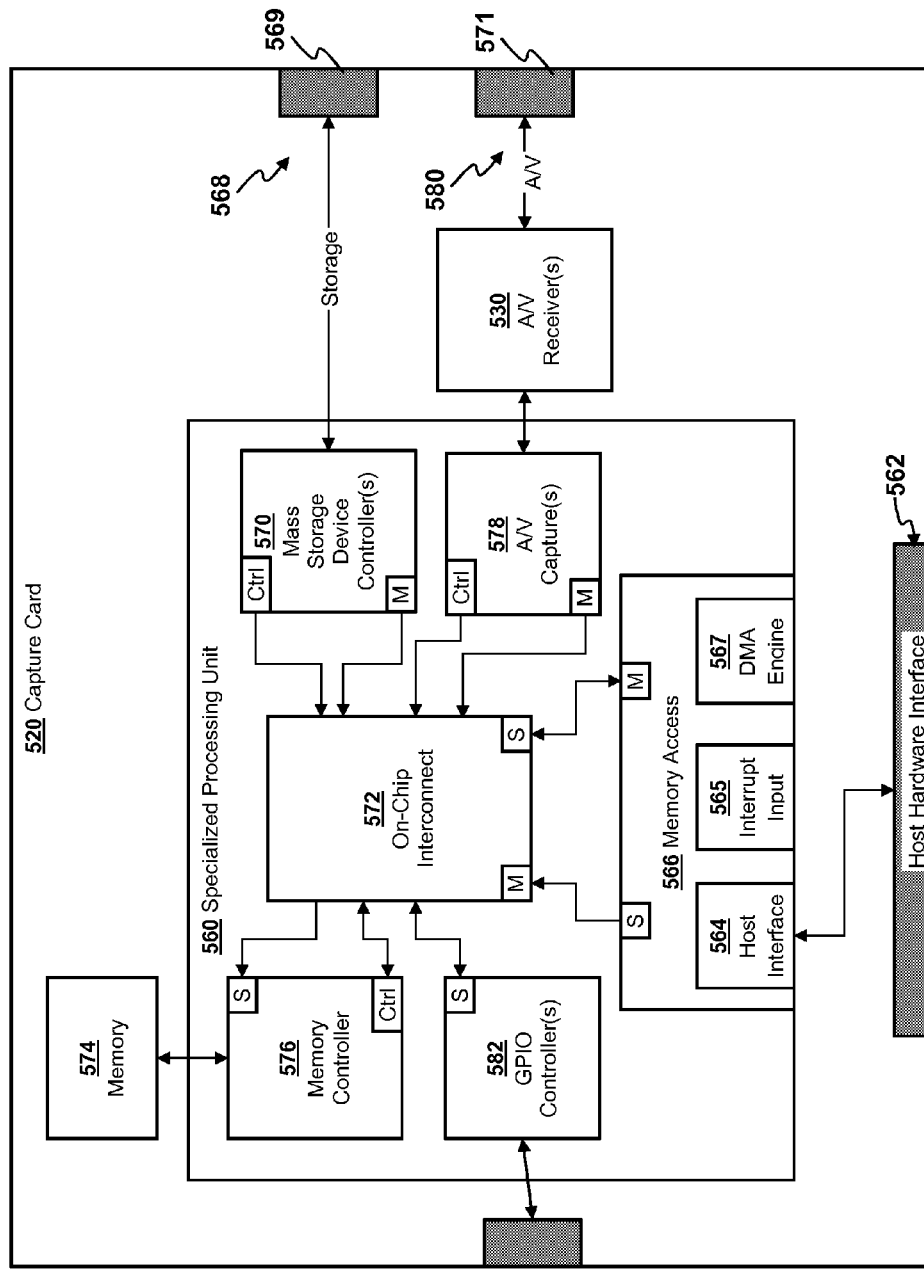
FIG. 5 is a schematic diagram of an example video capture card design having a specialized processing unit.

Turning now to FIG. 5, a schematic diagram of an example capture device 520 that may be implemented on the interface card 420, some components on it, and internals of an example specialized processing unit 560 is depicted in accordance with various implementations of the present disclosure. By way of example, and not by way of limitation, the capture device 520 may be configured as an add-on card having components attached to a printed circuit board (PCB), and the capture card 520 may interface with a peripheral bus of a host system through a host hardware interface 562, such as a peripheral expansion port or other expansion communication interface which allows communication the peripheral bus of a host system when connected.

It is noted that the example capture device 520 of FIG. 5 includes various optional components that are not necessary for video capture, but which may provide additional functionality for cloud computing and other implementations.

The example specialized processing unit 560 may include various blocks of logic dedicated to specialized functionality in accordance with various aspects of the present disclosure. The specialized processing unit may be implemented, e.g., as an FPGA, ASIC, or similar specialized processing unit. The specialized processing unit 560 may include a host interface block 564 which implements part of a protocol stack for the communication interface between the interface card 520 and a peripheral bus of a host system (not pictured in FIG. 5) for the capture device 560.

Communication busses like PCI-Express can be thought of as a protocol stack having several layers. Different communication protocols have different layers. Typically there is an 'application layer' at the top, then some transport related layers in the middle and some physical layer at the bottom. The host interface block 564 need not implement all layers of such a protocol stack. Instead, the host interface block may take care of the physical layer, which is responsible for putting digital information on a communication link, e.g., through electrical or optical signals. The host interface block may also be responsible for portions or possibly all of the 'transport layers' of the protocol stack, but need not be responsible for the application layer.

By way of example, and not by way of limitation, the host interface block 564 may be a hard PCIe block for communication through a PCI-Express connection, and which embeds the protocol stack for a PCIe interface or other interface for accessing a local bus of the host system. The host interface block 564 may be integrated into a memory access interface unit 566 which, together with other logic units of the specialized processing unit 560, may directly access system memory of a host system through the host hardware interface 562, e.g., using an interrupt of the request to the host system.

In some implementations, the memory access interface 566 may include components that provide memory access and interrupt functionality. In particular, the host interface block 564 may be configured to provide a connection between an on-chip-interconnect 572 and the host hardware interface 562 in a way that makes any on-chip device accessible from the host system using memory mapped Input/Output (I/O). This functionality would allow the host system to program any device connected to the on-chip-interconnect 572, such as the mass storage controller 570, memory controller 576, or GPIO 582.

The memory access interface 566 may also include an interrupt connection 565 that allows any connected device, e.g., the A/V capture units 578, to generate an interrupt upon an event (e.g., a captured video frame image is complete). It is desirable for the memory access interface to provide this functionality if there can be only one device interfacing with the host hardware interface hardware 562.

The memory access interface 566 may also (optionally) include a direct memory access (DMA) engine 567. As used herein, and as is generally understood by those skilled in the art, the term direct memory access (DMA) refers to a feature that allows certain hardware subsystems within a computer to access system memory independently of the computer's central processing unit (CPU). The DMA engine 567 may implement data move operations between the host interface block 564 and the host hardware interface 562. In some implementations, the memory access interface unit 566 may implement portions of a protocol stack (e.g., PCI Express)

not provided by the host interface block 564, such as connecting the host interface block 564 to the on-chip-interconnect 572.

For purposes of functionality for video capture, the capture device 520 may include one or more video and optionally audio/video communication interfaces 580, which may be implemented in the form of one or more HDMI ports 571 and/or connectors, or other video signal communication interfaces, and which may be attached to a circuit board of the capture device 520. By way of example, and not by way of limitation, the interface card 520 may contain two HDMI ports to facilitate connection to two distinct video sources/terminal systems, although it is noted that the capture device may alternatively contain a different number of video connectors so that a single capture device 520 may service a different number of video sources or terminal systems. For each of the video signal connectors 580, there may be a corresponding video capture unit 578 embodied in the specialized processing unit 560 that is compatible with the particular video communication interface (e.g., HDMI, DVI, VGA, etc.).

The one or more video capture units 578 of the specialized processing unit may be connected to other logic units of the specialized processing unit 560 through the on-chip interconnect 572, which may provide each of the video capture units 578 access to host system interface components (e.g., PCI-Express). The on-chip interconnect may be configured to a standard on-chip bus architecture configured to connect functional blocks on a specialized processing unit (e.g., an FPGA or ASIC). For example, if the specialized processing unit 560 is an FPGA, the components of the specialized processing unit may be interconnected using master-slave architecture, e.g., an Advanced Microcontroller Bus Architecture (AMBA), such as AXI4 or AXI4-Lite, or another suitable on-chip bus architecture. AXI4 may be used for large data transport and AXI-Lite may be used for low performance connections or for configuration purposes. The on-chip interconnections of the specialized processing unit logic blocks may be configured according to a master-slave type configuration as shown in FIG. 5. In the illustrated schematic, "M" and the corresponding bold lines represent represents a master connection, "S" and the corresponding dotted lines represent a slave connection, and "Ctrl" represents control.

The interface device 520 may include one or more memory units 574 which may be controlled by a memory controller 576 provided in the logic of the specialized processing unit 560. The memory unit may support data transport between a terminal system connected through the mass storage interface 568 and a host system connected through the host hardware interface 562, in accordance with data requests issued by the terminal system, e.g., for mass storage virtualization. For example, the memory unit 574 may be a temporary RAM unit, such as DDR3 RAM, or another volatile memory unit configured to temporarily store data requested by read requests issued by the terminal system, in accordance with principles described herein. The memory controller 576 may be connected to the on chip bus architecture 572 to perform memory read/write operations according to signals received from other logical units of the specialized processing unit 560.

During operation, a graphics driver and/or scanout unit of a video source (not pictured in FIG. 5) connected through the video interface 580 may generate enlarged output video frames having extra pixels to be captured by the capture card 520. Upon receiving the video output frames, the video capture unit(s) 578 may be configured to determine when each frame's visible display image pixels have been captured and omit the extra pixels in each frame from capture, discarding these extra pixels because they contain unneeded data. The captured video data for each frame may be transmitted to a video capture process in a host system using an interrupt through the host hardware interface 562 for further processing, compression, and/or transmission over a network. Compression may begin sooner for a given frame rate because a lower proportion of the pixels within each frame need to be transmitted in order to transfer all of the visible image pixels in the frame.

It is noted that each of the one or more A/V capture logic units 578 may be operatively coupled to a corresponding A/V receiver 530, each of which may in turn be connected to a suitable A/V hardware interface 580, such as an HDMI port 571 or other A/V connection port as shown in FIG. 5. A/V output from the terminal system may be connected to the A/V receiver 530 through the A/V interface 580 using a compatible A/V connector. The A/V capture unit 578 may communicate with the interface device driver and A/V process on the host system through the host hardware interface 562, which may be connected to a host system bus (e.g., a peripheral bus), and the host system may then deliver the A/V stream to a client device over a network.

The interface device may optionally include various other components which provide additional functionality for streaming applications run on a terminal system, such as cloud gaming streaming. For example, the specialized processing unit 560 may also include one or more mass storage device controllers 570 for emulating a storage device for one or more terminal systems. The interface device 582 may also include one or more general purpose input/output (GPIO) blocks to support additional functionality. By way of example, and not by way of limitation, each of the GPIO blocks may be connected to a corresponding one of the terminal system to provide additional functionality, such as power control of the terminal systems and other functionality.

As noted above, the specialized processing unit 560 may be implemented, e.g., as an FPGA, ASIC, or other integrated circuit having blocks dedicated to certain functionality, such as A/V capture, a mass storage device controller, memory controller, DMA engine, and the like, in accordance with various aspects of the present disclosure. In certain implementations of the present disclosure, one or more of these units may be provided as reusable units of logic or other chip design commonly referred to in the art as IP blocks or IP cores.

Figure 6:
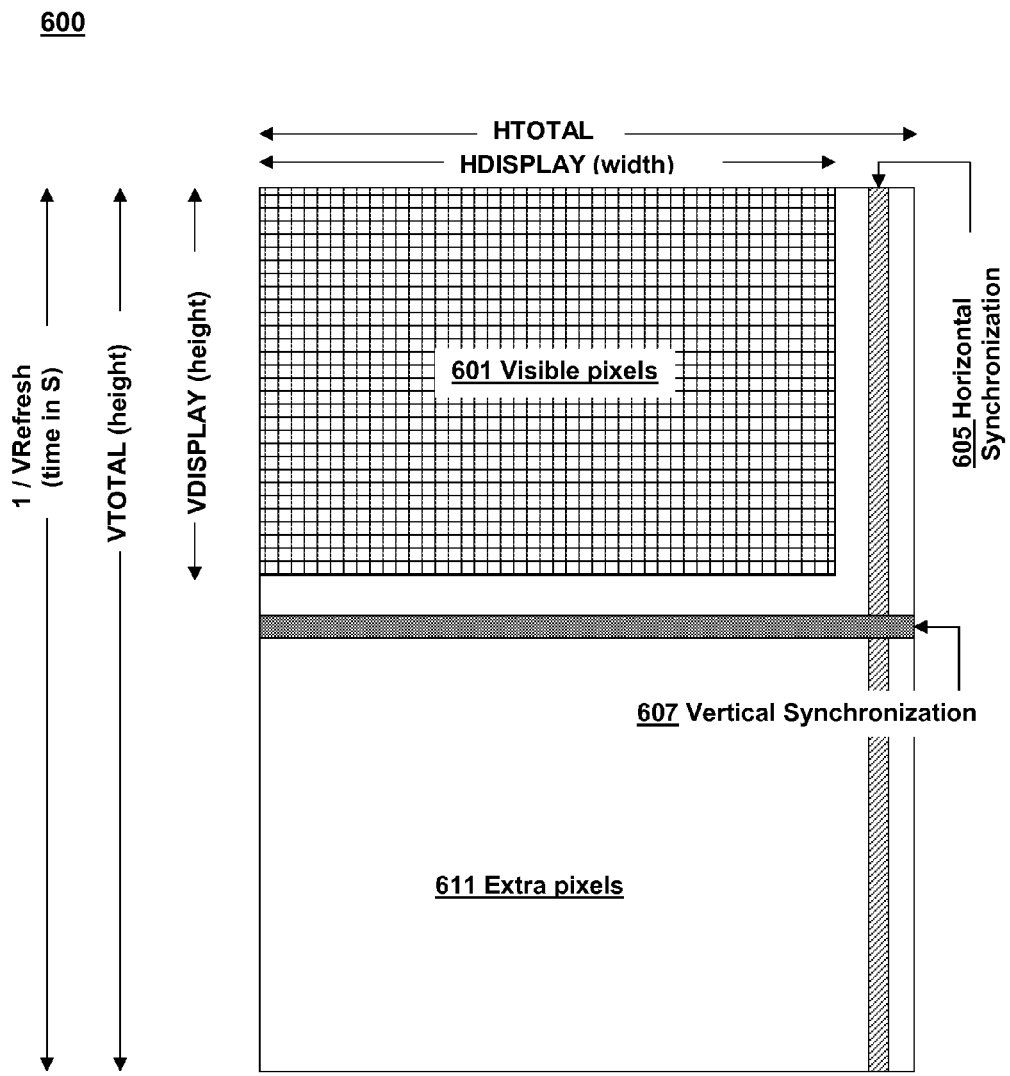
FIG. 6 is a schematic illustration of an example enlarged video frame having extra pixels.

Turning now to FIG. 6, an example of adding extra pixels to a source frame in accordance with a first illustrative technique is depicted. In particular, FIG. 6 depicts an example enlarged video frame 600 having extra pixels added in the form of extra lines 611 at the end of the source frame.

The extra lines 611 may be, in effect, dummy lines that are added to the end of the frame to create and enlarged and modified output frame 600. The dummy lines 611 may be added after a set of one or more synchronization signals 607 which indicate the end of the frame. In the example of FIG. 6, the lines are horizontally oriented, and the bottom of the frame corresponds to the end of the frame when it is transmitted as a sequence of pixels making up a sequence of lines.

Accordingly, in the example modified frame 600, the extra pixels 611 which are added to the end of the frame are illustrated at the bottom of the frame as a set of horizontal lines, which may be located after the active image lines 601 and after a set of VSYNC signals 607 that ordinarily indicate the end of the frame. It is noted that the extra pixels 611 may be added to a synchronization region generated for the output frame by essentially extending the vertical blanking region at the end of the modified frame 600, beyond what is needed to vertical synchronization.

One advantage to the first example technique depicted in FIG. 6 is that, because the visible video frame image coincides with the active region of the frame and the location of the vertical synchronization 607 remains to indicate the end of the image in the frame, the vertical synchronization signal 607 may still be used by a device receiving the enlarged frame 600 to know the cut off for the visible image 601 contained within the enlarged frame 600. Thus for example, where a video capture device is used to capture the visible image 601 in the frame, the video capture device may easily determine that transfer of the visible image 601 in the sequence of pixels is complete based on the presence of the vertical synchronization signals 607. This may be beneficial, for example, to facilitate compression of the display image 601 as soon as the vertical synchronization region 607 is reached during transfer, yet before the entire set of pixels in the frame has transferred.

Another advantage to the technique of FIG. 6 is that it may be made without requiring extensive software changes or changes to how the original video source frames are rendered. For example, using the illustrated terminal system of FIG. 4 as an example, the dummy lines may be generated by a scanout unit and/or sync signal generator, typically embodied as a hardware component, which may generate extra lines in the synchronization region after retrieval of the visible image pixels from the frame buffer. This may be accomplished without changes to a graphics driver or altering the display resolution in which the pixel data is rendered in a frame buffer by the GPU.

It is noted that, as a consequence of the additional lines at the end of the frame, a higher horizontal frequency may result in the modified frame 600, as compared to an unmodified version of the frame. Accordingly, to facilitate synchronized transfer of the modified frame 600, certain adjustments may be made to account for the greater horizontal frequency and avoid compatibility issues. In particular, one challenge associated with a higher horizontal frequency is that this frequency signal may be available from software. In gaming implementations, for example, some game may base some of the internal game timing on this horizontal frequency, and, as such, may have problems with timing. In certain implementations, these games may be modified to account for these problems, or the operating system may be modified to fake the timing.

In the example technique of FIG. 6, it is noted that the added pixels 611 may be invisible pixels that do not contain any data that needs to be captured for compression of the active image. It will be appreciated from a comparison between the modified frame 600 of FIG. 6 and the similar but unmodified source frame 300 of FIG. 3B, that the ratio of active lines to total lines within the frame (VDISPLAY/VTOTAL) is reduced significantly by adding the dummy lines 611, which may cause an increase in the pixel clock and corresponding decrease in the time to transfer the visible pixels 601 within the frame. In some implementations, the ratio of the number of the visible image lines in the output frame to the total number of lines in the output frame is between 0.25 and 0.75. In further implementations, the ratio of the number of the visible image lines in the output frame to the total number of lines in the output frame is between 0.4 and 0.6. In yet further implementations, the ratio of the number of the visible image lines in the output frame to the total number of lines in the output frame is approximately 0.5.

In particular, it is noted that 720p (1280×720) resolution typically uses a total number of pixels in each line (HTOTAL) of around 1650 and a total number of vertical lines (VTOTAL) of around 750. In particular, the ratio of total vertical lines to visible lines in this conventional example is 720/750=0.96. Conventional wisdom dictates that this number should close to 1, as it is in this conventional example. Implementations of the present disclosure, by contrast may use a ratio much lower than 1 to speed up transfer of the visible pixels in a frame.

The lower limit of this ratio, i.e., the maximum number of dummy lines that may be added to a frame in this example, may be limited by hardware. For example, with respect to HDMI 1.0, the limit was 165 MHz, but 1.3 moved it to 340 MHz. Most consumer hardware at the time of this writing uses the 165 MHz limit.

Thus, for example, for hardware having a limit of 165 MHz, the maximum number of total lines for rendering a 720p frame would be 165 MHz/(1650×60)=1666 lines, corresponding to a ratio of 720/1666=0.43. Note that the ratio used is 720, and not 750, because 720 the number of visible lines in this example of a 720p frame.

By way of further example, for hardware having a limit of 340 MHz, the lower limit of the ratio of visible lines to total lines in an output frame may be is around 0.2.

Figure 7A:
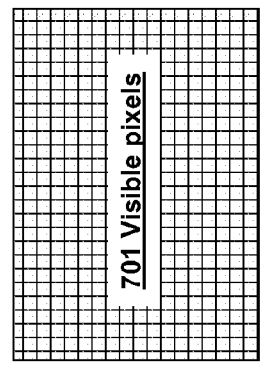
FIGS. 7A-7B are schematic illustrations of additional examples of enlarged video frames having extra pixels.
Figure 7A:
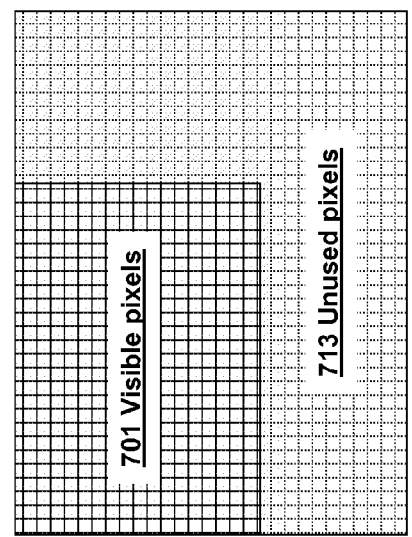
Figure 7A:
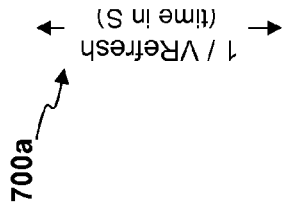
Figure 7B:
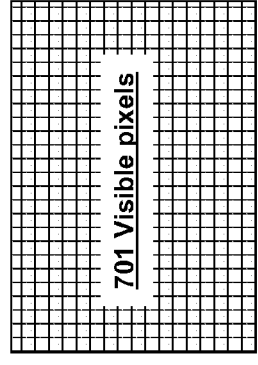
Figure 7B:
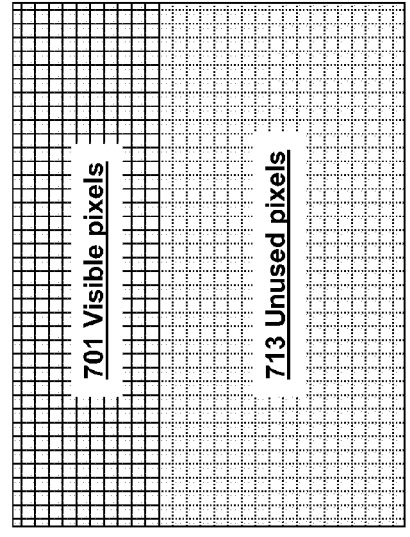
Figure 7B:
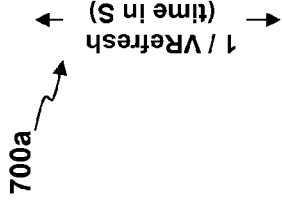

Turning now to FIGS. 7A-7B, further examples of adding extra pixels to in a video output frame are depicted. In the illustrative examples of FIG. 7A-7B, the enlarged frame 700b may be generated by rendering a video frame image into a frame having a larger display resolution than the number of pixels in the rendered video frame image, filling in the remaining pixels of the larger resolution with extra pixels, e.g., invisible pixels. It is noted that only the active image region of the frames 700a,b are depicted in FIGS. 7A-7B for purposes of illustration only. It is noted that after these frames are rendered, e.g., by a GPU/graphics driver to a frame buffer, output frames may be formed by scanning out the frames from the frame buffer, further adding synchronization signals, a pixel clock signal, and/or other external signals to these frames in accordance with implementations of the present disclosure, e.g., using a scan out unit as shown in FIGS. 4A-4B.

In particular, FIG. 7A-7B depict examples of enlarged video frames 700b having extra pixels 713, which are added by repacking the original video frame image 700a into a larger frame that has a higher display resolution than the visible frame image 700a. As a result, the total number of pixels in the enlarged frame 700b exceeds the total number of visible image pixels 701 in the visible video frame image. In particular, the frame 700b may include the visible pixels 701 from the original frame image 700a, as well as the extra pixels 713 which fill the remainder of the larger frame. It is noted that the extra pixels 713 in the modified frame 700b may essentially be unused pixels of the higher display resolution frame.

It is noted that the example frame repacking technique of FIGS. 7A-7B for adding extra pixels to a source video frame may be implemented in a variety of ways. For example, each of the frames 700a and 700b may have both a horizontal resolution and a vertical resolution, which may be defined by a number of active pixels within each line and a number of active lines within each frame, respectively. In accordance with aspects of the present disclosure, the larger frame 700b may have a larger horizontal resolution, a larger vertical resolution, or both.

In some implementations, each single line of the source frame 700a may be packed into a respective one of the lines of the larger frame 700b, as shown in FIG. 7A. Where the larger frame 700b has a greater number of active pixels within each line than there are visible image pixels 701 within each visible image line of the source image 700a, e.g., where an enlarged frame has a greater horizontal resolution as shown in FIG. 7A, packing only single lines of the source frame into respective single lines of the larger frame 700b in this manner may result in essentially wasted pixels at the end of each line, as shown in FIG. 7A. Specifically, what is meant by wasted pixels is that extra pixels 713 at the end of each line, which are not visible image pixels 701 of the video frame, would still need to be transferred at the end of each line when outputting the frame before the entire visible image 701 in the frame is transferred, when the pixels are transferred sequentially line by line. However, this example approach of FIG. 7A may be desirable in spite of potentially wasted pixels at the end of each line because it may provide a practical and easy way to implement such a solution. Moreover, transfer delay may still be reduced because all of the visible image pixels 701 may be located before at least some of the extra, added pixels 713 in the larger frame, e.g., those extra pixels in the active lines which are located after the last visible lines in the frame 700b.

As an alternative to the example of FIG. 7A, each line of the larger frame 700b may contain more than one line of the source frame 700a, depending on how many pixels each line of the higher resolution frame could fit, as shown in FIG. 7B. By way of example, and not by way of limitation, if the source video frame 700a is 1280×720 (720p), the larger frame 700b could be, for example, 1920×1080 (1080p). Using the approach of FIG. 7B, one 1080p line may fit 1.5 720p lines (1080/720=1.5). In total, 720/1.5=480 lines of the 1080p frame would be required to fit the visible frame image 701 when the visible pixels are packed to the end of the line. In other words, with reference to the example 60 Hz refresh rate, the HDMI transfer time may be 480/1080*16.7 ms=7.4 ms. While such an approach as shown in FIG. 7B may be, in some respects, more complex to implement than the approach of FIG. 7A, which simply packs each line of the source frame 700a into a corresponding lines at the beginning of the higher display resolution frame 700b, it has the added benefit of fully utilizing the lines at the beginning of the frame without wasting pixels, thereby more efficiently packing the visible pixels at the beginning of the modified frame 700b. As a result, the transfer time for outputting the visible pixels 701 may be better optimized due to the more efficient packing of the visible image in the modified frame 700b, as yet fewer lines of the enlarged frame's active region would be needed.

It is noted that, unlike the example enlarged frame 600 of FIG. 6, in which dummy lines are added after the vertical synchronization region, the added pixels 713 in the frame repacking method of FIGS. 7A-7B has extra but unused pixels 713 (i.e., unused insofar as they do not need to contain any of the visible image data of the frame) that may still be located before the vertical synchronization region (not pictured) of the frame 700b in accordance with the higher display resolution of this larger frame format. As a result, the vertical synchronization signal, which would be located after the last line of the frame's active region, does not indicate the end of the visible lines 701 in the frame, due to the presence of the extra pixel lines 713 in the active region of the frame. Accordingly, the video capture device may be configured to determine the cutoff of the visible frame image by some other technique, instead of the VSYNC signal. For example, the video capture device may be configured to count lines, based on the display resolution of the original video frame image, enlarged frame display resolution, and frame packing technique used in the output frame. Compression of the visible image 701 may then begin sooner, without having to wait for the extra pixels 713 in the modified to be transferred, based on the cutoff point determined from counting the lines. Turning to the system of FIGS. 4B and 5, for example, the video capture unit 578 contained in the specialized processing unit may be configured to count pixels or lines in each output frame received from the video source 412 though the video interface, and notify the video capture process 434 (e.g., using an interrupt) once a predetermined number of lines has been transferred and captured. Compression, e.g., by an encoder, may begin sooner, without waiting for the entire active region of the video output frame to be transferred.

It is noted that, in implementing the example second technique, it may be beneficial to include additional video memory on the video source, such as the terminal system 412 in FIG. 4A, to account for the larger amount pixel data in each frame (albeit invisible data). It is further noted that modifications to a graphics driver of the terminal system may be needed in order to render the frames in a different format from the original content with extra pixels added to each rendered video frame image.

Figure 8:
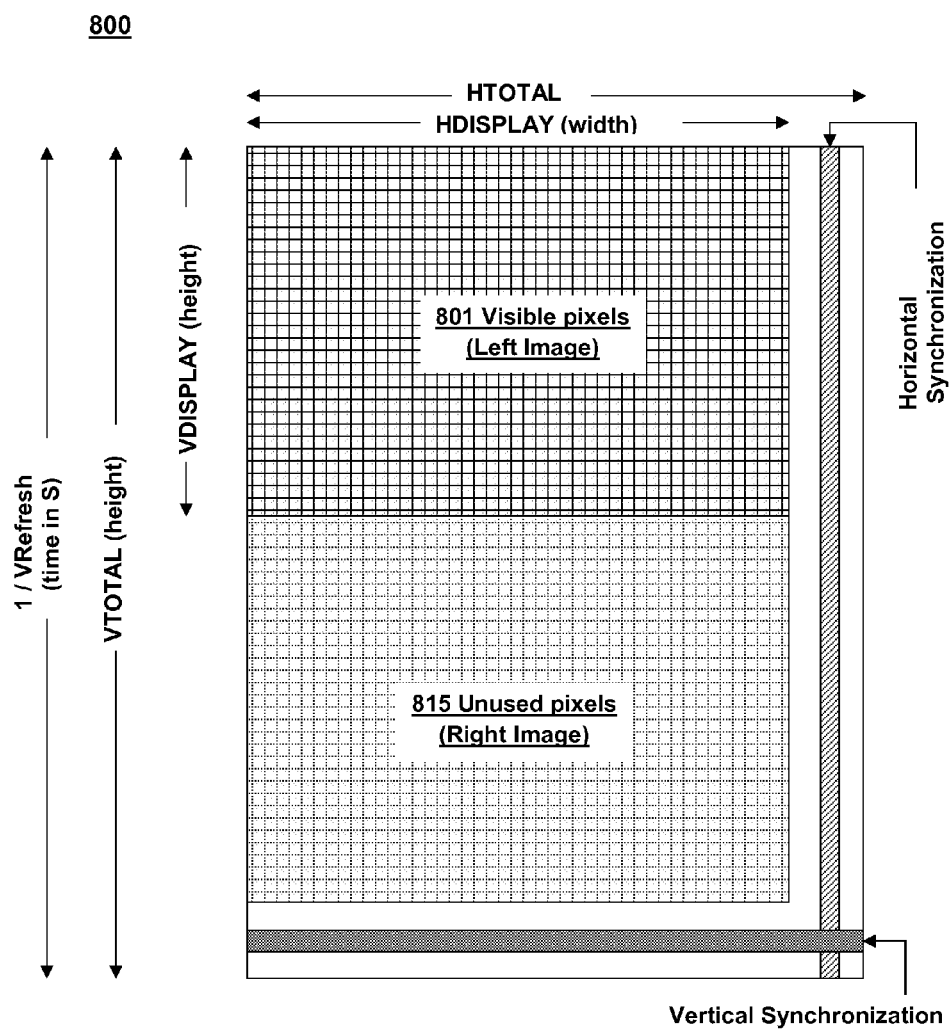
FIG. 8 is a schematic illustration of yet another example of an enlarged video frame having extra pixels.

Turning now to FIG. 8, yet another example of adding extra pixels to a video output frame in accordance with a yet another illustrative technique is depicted. It is noted that in the examples of FIG. 7A-7B, the visible pixels of the visible frame image are rendered in a mono frame format having a higher display resolution than the video frame image, i.e., the frame is in a two-dimensional format. In other implementations, e.g., as shown in FIG. 8, the enlarged frame format may be a stereo 3D format, in which the higher display resolution of the output video frame is defined by an active display region that is made up of two distinct images corresponding to a left image and a right image.

In the example of FIG. 8, extra pixels 815 may be added to a source frame by packing the visible image of the source frame into only one of the two images in the a stereo 3D frame format. The other of the two images may be filled with the extra pixels 915, so that the visible pixels of the video frame image are rendered entirely in one of the two images in the active region of the 3D frame.

It is noted that there are many conventional stereo 3D formats which pack two images, e.g., left and right images, into a single stereo 3D frame. In the example modified frame 800 of FIG. 8, the stereo 3D frame has a top and bottom format (sometimes known as an over/under format), in which the left and right images are arranged with one above the other. Examples of other stereo 3D formats include side by side format, interleaved format, and others formats. In general, stereo 3D formats other than the top and bottom format in illustrated example of FIG. 8 may be used in accordance with aspects of the present disclosure.

For example, a stereo 3D frame may have a defined sequence of pixels for transmission, including pixels for each of the two images (left and right images) in the frame. Implementations of the present disclosure may utilize a stereo 3D format in which all or a significant part of one of the two images is located later in the sequence than the other of the two images, e.g., the pixels of the left image are located in the sequence before some or all of the pixels in the right image. In the example top and bottom stereo 3D frame 800 of FIG. 8, the top left image 801 is located earlier in the sequence of the frame 800 than the bottom "right" image 815. Thus, when the frame's pixels are transferred sequentially, the visible pixels 801 in the top image are transferred before the pixels 815 in the bottom image. Because the visible pixels of the source frame may be rendered entirely in the top image, and the right image pixels are not used for actual 3D display but are instead merely used as extra dummy pixels for artificially increasing the total number of pixels in the output frame, the entire visible image of the frame may be transferred earlier in accordance with an increase in the pixel clock. In particular, as shown in FIG. 8, the total number of lines VTOTAL is increased as compared to the content of the original source frame.

It is emphasized that the enlarged frames of FIGS. 6-8 are provided as illustrative examples only to illustrate various aspects of the present disclosure. Moreover, it is important to note that the techniques of FIGS. 6-8 are not mutually exclusive, and various combinations of the example techniques may be used. For example, a combination of the example of FIGS. 7A/7B and FIG. 8 utilized in accordance with implementations of the present disclosure, in which each frame may not only be packed in to a larger frame having a higher resolution, but may be packed into a single image of a stereo 3D frame in which each of the left and right images of the 3D frame have a higher display resolution than the source image. Thus, for example, if the source image is at 480p, it may be packed into the left image of a 720p Stereo 3D frame.

Figure 9A:
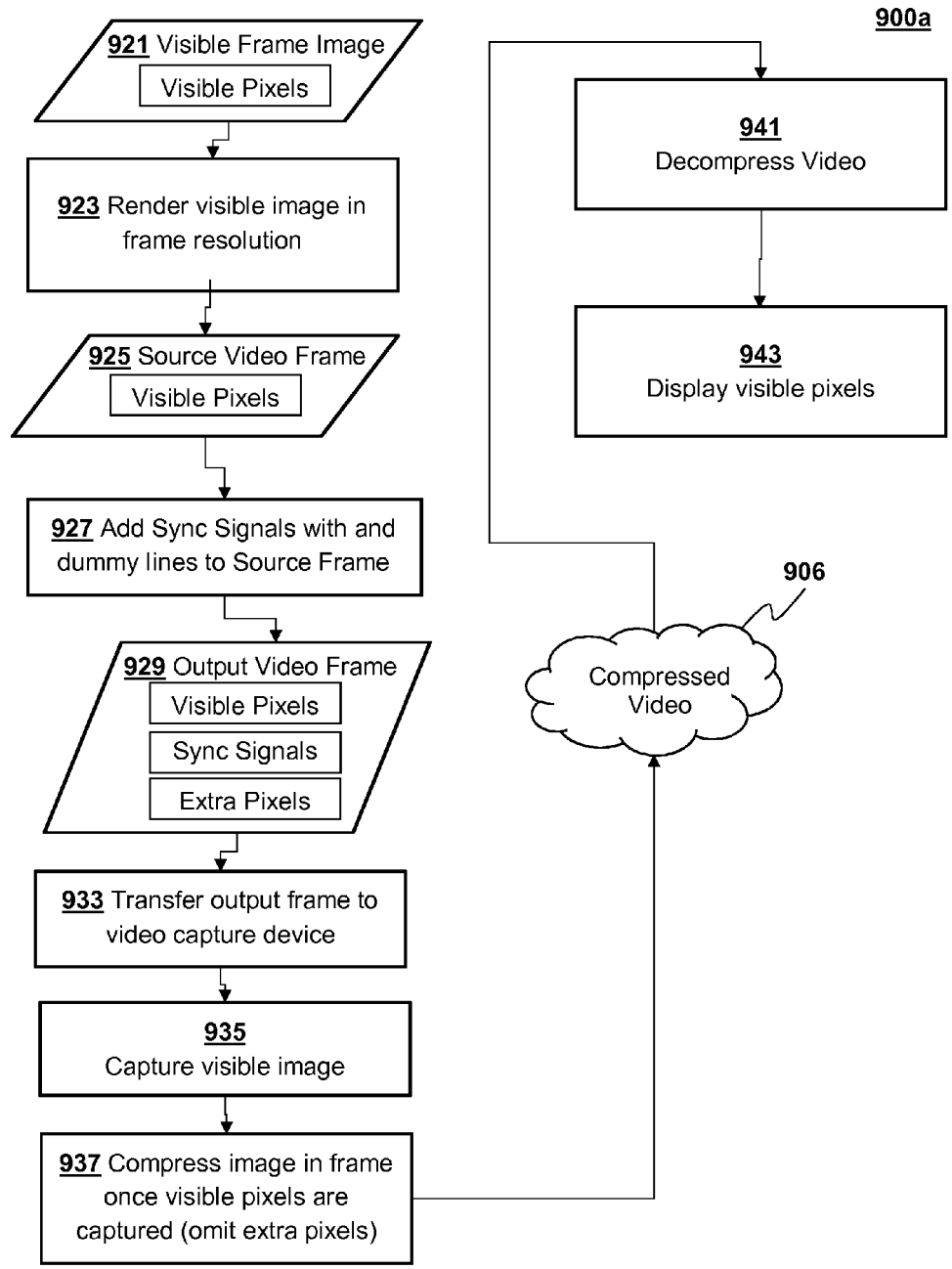
FIGS. 9A-9B are flow diagrams of example method of capturing enlarged video output frames.

Turning to FIG. 9A, an example method 900*a* of capturing an output video signal using enlarged frames with extra pixels is depicted. In particular, in the example method 900*a*, extra pixels are added to the frame in the form of extra dummy lines added to after to the synchronization lines after the active image of the output frame. The method 900*a* may involve forming, capturing, and compressing a video output frame that is similar to the example frame 700 of FIG. 7.

In particular, the method 900*a* involves a visible image for a video frame 921. By way of example, and not by way of limitation, the visible image 921 may be generated by a computer application based on the state of the program. The computer graphics may be generated in a first resolution defined by a number of visible pixels in the image, and the method may involve rendering the video image 923 into a frame having a number of pixels coinciding with the number of visible pixels of the underlying content 921, thereby generating a source video frame 925 defining the display region of the eventual output frame. For example, the source video frame may be rendered into a frame buffer by a GPU.

The method may involve forming an output frame by adding synchronization signals 927 to the source frame 925. Adding the sync region to the frame may involve not only adding the usual sync signals to the frame, but also adding an extended set of dummy lines after the synchronization lines in the sequence, e.g., using a sync signal generator as shown in FIG. 4A. The resulting output frame 929 may have an increased number of lines compared to a typical frame. By way of example, and not by way of limitation, the visible image lines may occupy only half of the total lines in the output frame or less, which may cause a corresponding increase in the pixel clock. In particular, adding the dummy lines to the synchronization region may be performed by scanning out the source frame image from the frame buffer, e.g., as described above.

The pixels may then be transferred to a video capture device 933 at a higher pixel frequency, due to the present of the dummy lines in the output frame 929. Accordingly, the visible pixels from the visible frame image 921 may be captured 935 with the video capture device more quickly, because the visible pixels may reach the capture device in a shorter amount of time.

The capture device may be configured to stop capture 935 of the output frame and/or initiate compression 937 of the frame image (e.g., with an encoder) as soon as the visible pixels have been captured, e.g., by determining that all of the visible pixels have been transferred based on the detection of the synchronization lines, which in this example indicate the end of the visible frame image. The compressed video frame may then be sent over a network 906 so that the video signal may be decoded 941 and presented as the visible image on the display 943, e.g., at a remote device from the capture system. The process may be repeated continuously for each video frame to transmit a real-time stream of the video content.

Figure 9B:
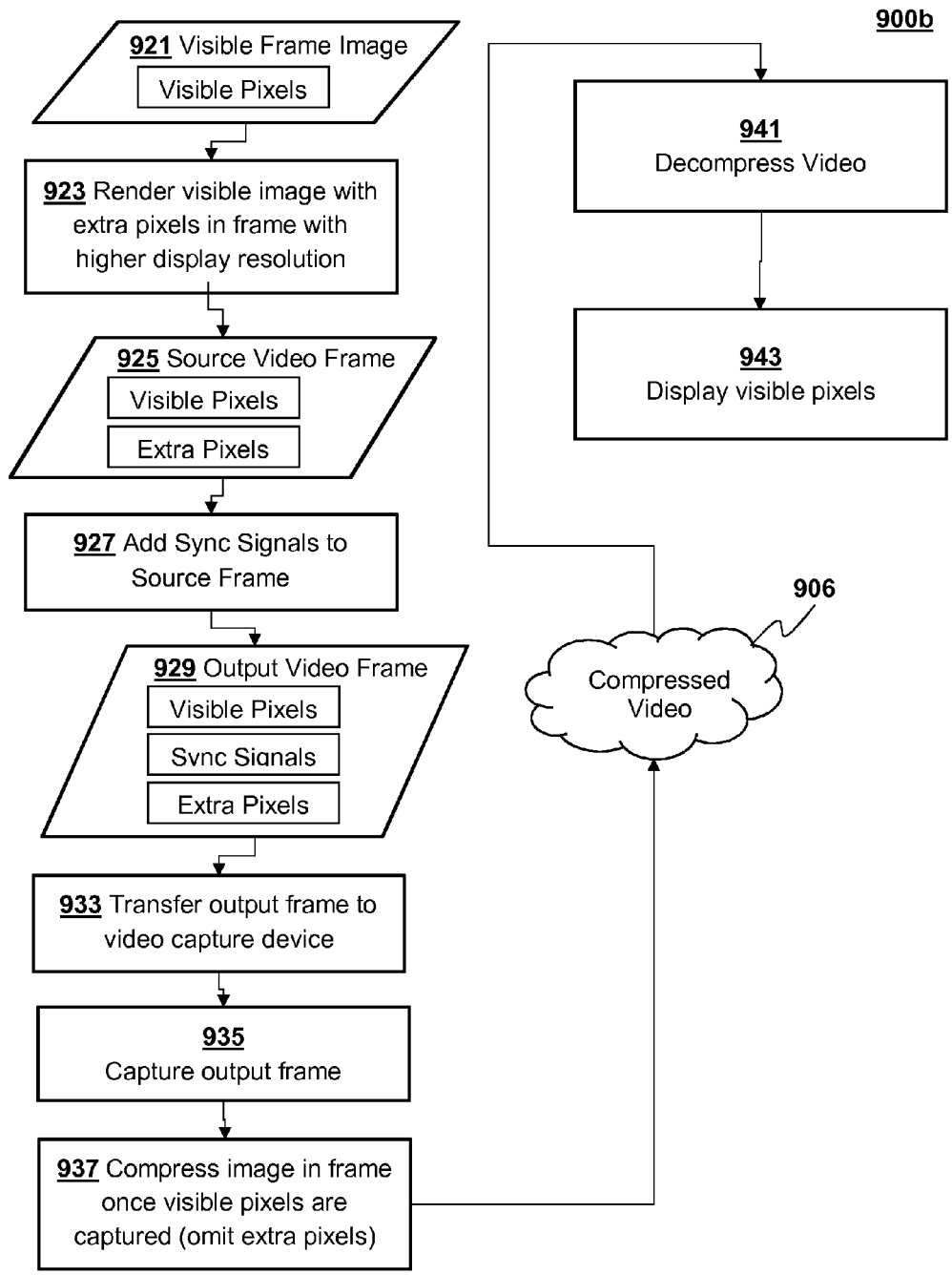

Turning now to FIG. 9B, a similar example method 900*b* of capturing, compressing, and transmitted video frames is depicted. However, in contrast to the example of FIG. 9A, the method 900*b* involves adding the extra pixels to the active region of a frame, e.g., to generate output frames as shown in FIGS. 7A-8 above.

In particular, the visible frame image 921, which may be generated with a number of visible pixels for a first display resolution, may be rendered into a larger frame 923 with a higher display resolution and a plurality of extra pixels, as shown in FIG. 9B. By way of example, and not by way of limitation, this may involve packing the frame image into a larger mono image or into a single active image region (e.g., left or right) of a stereo 3D frame format. In certain implementations, this may be accomplished by rendering the larger image having the extra pixels into a frame buffer with the extra pixel, e.g., as described above. The enlarged image may then be scanned out to generate an output frame having a synchronization region and/or other external signals, e.g., as described above.

In this example, the synchronization lines may no long signify the end of the visible image region, e.g., because the visible lines occupy only a portion of the active lines of the output frame 929 due to the presence of the extra pixels in the active image region. In order to begin a compression process as soon as the image is transferred, the video capture device may be configured to determine the end of the visible image region by counting pixels or lines that are transferred to it. The video signal may then be compressed 937 sooner, before the entire active region of the output frame is transferred, and the encoded frame may be transmitted over the network 906 for decoding 941 and remote display 943, as before.

Conclusion

It is noted that aspects of the present disclosure have been described with reference to cloud gaming as a particular example in which a need for faster transfer of a the visible images in a video frames may be desirable, but implementations of the present disclosure are not so limited. Implementations of the present disclosure may provide reduced transfer delay from any video source to a video sink for other purposes, which may not involve cloud computing or cloud gaming.

It is noted that implementations of the present disclosure may utilize any of a variety of audio and/or video standards, including HDMI, S-Video, component video, composite video, Display Port, VGA, DVI, and other video or A/V communication interface standards.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method comprising:
for a first video frame image having a plurality of visible image pixels in a first display resolution, inserting the first video frame image into a source video frame having a second display resolution greater than the first display resolution; and
compressing the first video frame image,
wherein the source video frame is in a stereo 3D format having two image regions in the active display region,
wherein said inserting the first video frame image includes inserting the plurality of visible image pixels and a plurality of extra pixels into an active display region of the source video frame,
wherein said inserting the first video frame image includes inserting the plurality of visible image pixels into one of the two image regions and filling the other of the two image regions with the extra pixels.

2. The method of claim 1, further comprising:
forming an output video frame by adding a plurality of synchronization signals to the source video frame.

3. The method of claim 1, further comprising:
forming an output video frame by adding a plurality of synchronization signals to the source video frame;
transferring the output video frame to a video capture device;
capturing the visible image pixels in the output video frame with the video capture device, while omitting the extra pixels from said capturing.

4. The method of claim 1, further comprising:
forming an output video frame by adding a plurality of synchronization signals to the source video frame;
transferring the output video frame to a video capture device;
capturing the visible image pixels in the output video frame with the video capture device, while omitting the extra pixels from said capturing;
wherein compressing the first video frame image includes compressing the first video frame image after the visible image pixels have been captured, beginning said compressing before the entire active display region of the output video frame has been transferred.

5. The method of claim 1,
wherein the source video frame is in a stereo 3D format having two image regions in the active display region, the two image regions corresponding to a left image region and a right image region.

6. The method of claim 1,
wherein the source video frame is in a top-and-bottom stereo 3D format having two image regions in the active display region, the two image regions corresponding to a left image region and a right image region arranged in the top of the active display region and the bottom of the active display region, respectively;
wherein said inserting the first video frame image includes inserting the plurality of visible image pixels into the top image of the active display region and filling the bottom of the active display region with the extra pixels.

7. The method of claim 1,
wherein the source video frame is in a stereo 3D format having two image regions in the active display region, the two image regions corresponding to a left image region and a right image region, each of the two image regions having a greater display resolution than the first display resolution of the first video frame image.

8. A method comprising:
for a first video frame image having a plurality of visible image pixels in a first display resolution, inserting the first video frame image into a source video frame having a second display resolution greater than the first display resolution, wherein said inserting the first video frame image includes inserting the plurality of visible image pixels and a plurality of extra pixels into an active display region of the source video frame and compressing the first video frame image,
wherein the first video frame image has a plurality of visible image lines, each said visible image line having a plurality of the visible image pixels;
wherein the source video frame is in a mono format with the active display region defining a mono image region;
wherein the mono image region has a plurality of active lines, each said active line having a plurality of active pixels;
wherein the number of active lines in the mono image region is greater than the number of visible image lines in the first video frame image;
wherein the number of active pixels in each said active line is greater than the number of visible image pixels in each said visible image line;
wherein said inserting the first video frame includes filling at least some of the active lines with the visible image pixels, such that at least some of the active lines each include the visible image pixels from more than one of the visible image lines.

9. The method of claim 8,
wherein the source video frame has a defined sequence of pixels for transfer,
wherein said inserting the first video frame image includes inserting at least some of the plurality of extra pixels at a location after the plurality of visible image pixels in the sequence.

10. A system comprising:
a first processing unit; and
a first memory unit operatively coupled to the first processing unit,
wherein the system is configured to perform a method, the method comprising:
for a first video frame image having a plurality of visible image pixels in a first display resolution, inserting the first video frame image into a source video frame having a second display resolution greater than the first display resolution and compressing the first video frame image, wherein the source video frame is in a stereo 3D format having two image regions in the active display region, wherein said inserting the first video frame image includes inserting the plurality of visible image pixels and a plurality of extra pixels into an active display region of the source video frame, wherein said inserting the first video frame image includes inserting the plurality of visible image pixels into one of the two image regions and filling the other of the two image regions with the extra pixels.

11. The system of claim 10, the method further comprising:

forming an output video frame by adding a plurality of synchronization signals to the source video frame.

12. The system of claim 10, further comprising:

a video capture device operatively coupled to the first processing unit through a video communication interface, the method further comprising:

forming an output video frame by adding a plurality of synchronization signals to the source video frame;

transferring the output video frame to the video capture device;

capturing the visible image pixels in the output video frame with the video capture device, while omitting the extra pixels from said capturing.

13. The system of claim 10, further comprising:

a video capture device operatively coupled to the first processing unit through a video communication interface; and a computer system having a second processing unit and a second memory unit operatively coupled to the video capture device, the method further comprising:

forming an output video frame by adding a plurality of synchronization signals to the source video frame;

transferring the output video frame to the video capture device;

capturing the visible image pixels in the output video frame with the video capture device;

compressing, with the computer system, the first video frame image after the visible image pixels have been captured, beginning said compressing before the entire active display region of the output video frame has been transferred.

14. The system of claim 10, wherein the first processing unit is a graphics processing unit (GPU) configured to render the video frame image in the second display resolution.

15. A non-transitory computer readable medium having processor-executable instructions embodied therein, wherein execution of the instructions by a processor causes the processor to perform a method, the method comprising:

for a first video frame image having a plurality of visible image pixels in a first display resolution, inserting the first video frame image into a source video frame having a second display resolution greater than the first display resolution and compressing the first video frame image, wherein the source video frame is in a stereo 3D format having two image regions in the active display region, wherein said inserting the first video frame image includes inserting the plurality of visible image pixels and a plurality of extra pixels into an active display region of the source video frame, wherein said inserting the first video frame image includes inserting the plurality of visible image pixels into one of the two image regions and filling the other of the two image regions with the extra pixels.

16. A non-transitory computer readable medium having processor-executable instructions embodied therein, wherein execution of the instructions by a processor causes the processor to perform a method, the method comprising:

for a first video frame image having a plurality of visible image pixels in a first display resolution, inserting the first video frame image into a source video frame having a second display resolution greater than the first display resolution, wherein said inserting the first video frame image includes inserting the plurality of visible image pixels and a plurality of extra pixels into an active display region of the source video frame, wherein the first video frame image has a plurality of visible image lines, each said visible image line having a plurality of the visible image pixels;

wherein the source video frame is in a mono format with the active display region defining a mono image region;

wherein the mono image region has a plurality of active lines, each said active line having a plurality of active pixels;

wherein the number of active lines in the mono image region is greater than the number of visible image lines in the first video frame image;

wherein the number of active pixels in each said active line is greater than the number of visible image pixels in each said visible image line;

wherein said inserting the first video frame includes filling at least some of the active lines with the visible image pixels, such that at least some of the active lines each include the visible image pixels from more than one of the visible image lines.

17. A system comprising:

a first processing unit; and a first memory unit operatively coupled to the first processing unit, wherein the system is configured to perform a method, the method comprising: for a first video frame image having a plurality of visible image pixels in a first display resolution, inserting the first video frame image into a source video frame having a second display resolution greater than the first display resolution, wherein said inserting the first video frame image includes inserting the plurality of visible image pixels and a plurality of extra pixels into an active display region of the source video frame, wherein the first video frame image has a plurality of visible image lines, each said visible image line having a plurality of the visible image pixels;

wherein the source video frame is in a mono format with the active display region defining a mono image region;

wherein the mono image region has a plurality of active lines, each said active line having a plurality of active pixels;

wherein the number of active lines in the mono image region is greater than the number of visible image lines in the first video frame image;

wherein the number of active pixels in each said active line is greater than the number of visible image pixels in each said visible image line;

wherein said inserting the first video frame includes filling at least some of the active lines with the visible image pixels, such that at least some of the active lines each include the visible image pixels from more than one of the visible image lines.

* * * * *